(12) United States Patent
Noguchi

(10) Patent No.: US 10,911,681 B2
(45) Date of Patent: Feb. 2, 2021

(54) DISPLAY CONTROL APPARATUS AND IMAGING APPARATUS

(71) Applicant: SONY CORPORATION, Tokyo (JP)

(72) Inventor: Shohei Noguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 101 days.

(21) Appl. No.: 16/092,300

(22) PCT Filed: Mar. 29, 2017

(86) PCT No.: PCT/JP2017/012906
§ 371 (c)(1),
(2) Date: Oct. 9, 2018

(87) PCT Pub. No.: WO2017/191716
PCT Pub. Date: Nov. 9, 2017

(65) Prior Publication Data
US 2020/0059602 A1    Feb. 20, 2020

(30) Foreign Application Priority Data

May 6, 2016 (JP) ................................. 2016-092994

(51) Int. Cl.
*H04N 5/232* (2006.01)
*H04N 9/04* (2006.01)
*H04N 9/07* (2006.01)
*G03B 11/00* (2006.01)
*G03B 17/18* (2006.01)

(52) U.S. Cl.
CPC ......... *H04N 5/23293* (2013.01); *G03B 11/00* (2013.01); *H04N 5/232* (2013.01); *H04N 9/0455* (2018.08)

(58) Field of Classification Search
None
See application file for complete search history.

(56) References Cited

U.S. PATENT DOCUMENTS

| 2009/0027543 | A1* | 1/2009 | Kanehiro | ............ | H04N 1/4092 |
| | | | | | 348/342 |
| 2010/0277491 | A1 | 11/2010 | Hiratsuka | | |
| 2012/0314919 | A1* | 12/2012 | Sparks | ................ | G06K 9/6215 |
| | | | | | 382/128 |

(Continued)

FOREIGN PATENT DOCUMENTS

| JP | 2010-263341 A | 11/2010 |
| JP | 2014-146935 A | 8/2014 |

(Continued)

OTHER PUBLICATIONS

International Search Report dated Jun. 20, 2017 in PCT/JP2017/012906, 2 pages.

*Primary Examiner* — Mohammed Rachedine
(74) *Attorney, Agent, or Firm* — Oblon, McClelland, Maier & Neustadt, L.L.P.

(57) ABSTRACT

A display control apparatus according to an embodiment of the present disclosure includes a display controller that performs enhancement on a region where resolution is changed in response to changing of lowpass characteristics or a region where false color is generated or changed in response to changing of the lowpass characteristics in image data generated on the basis of light incident via a lowpass filter.

13 Claims, 25 Drawing Sheets

(56) References Cited

U.S. PATENT DOCUMENTS

| | | | | |
|---|---|---|---|---|
| 2014/0229336 A1* | 8/2014 | Wormhoudt | ....... | G06Q 30/0627 705/26.63 |
| 2015/0339283 A1* | 11/2015 | Burson | ................ | G06T 11/40 715/227 |
| 2015/0348234 A1* | 12/2015 | Peng | .................... | G06K 9/52 382/199 |
| 2016/0084932 A1 | 3/2016 | Ito | | |
| 2016/0212348 A1* | 7/2016 | Tatsumi | ............... | G06T 3/4092 |
| 2017/0019599 A1 | 1/2017 | Muramatsu et al. | | |

FOREIGN PATENT DOCUMENTS

| | | |
|---|---|---|
| JP | 2016-38352 A | 3/2016 |
| JP | 2016-63468 A | 4/2016 |
| WO | WO 2015/098305 A1 | 7/2015 |

\* cited by examiner

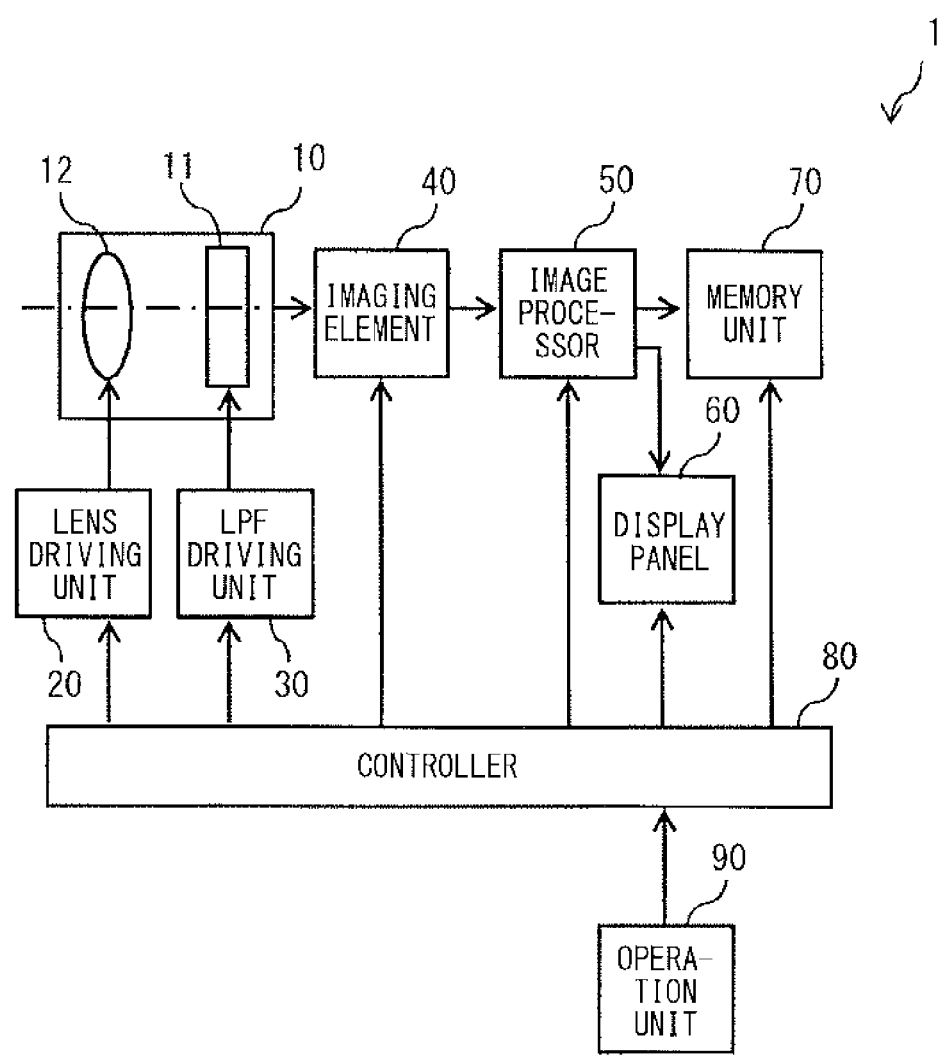

[ FIG. 2 ]
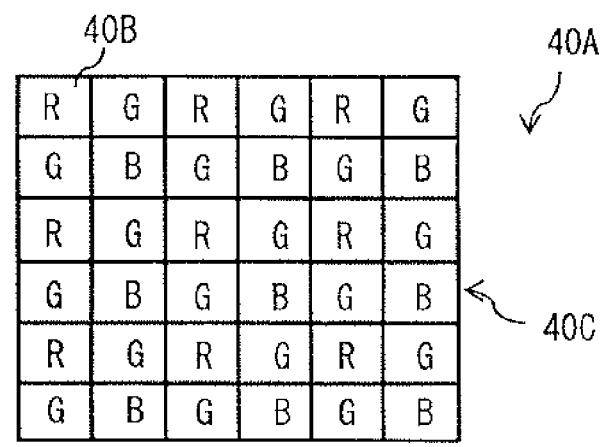
[ FIG. 3 ]
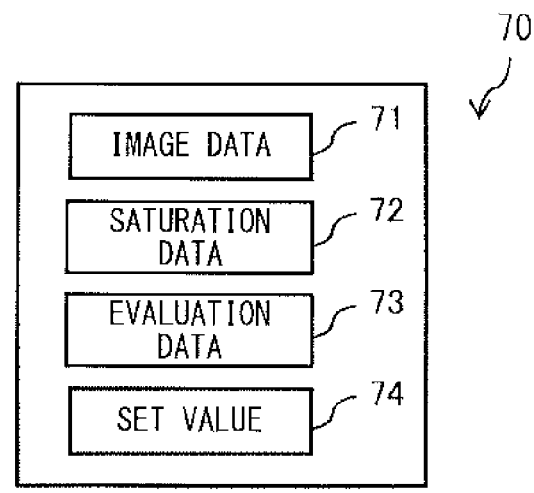

[ FIG. 4 ]
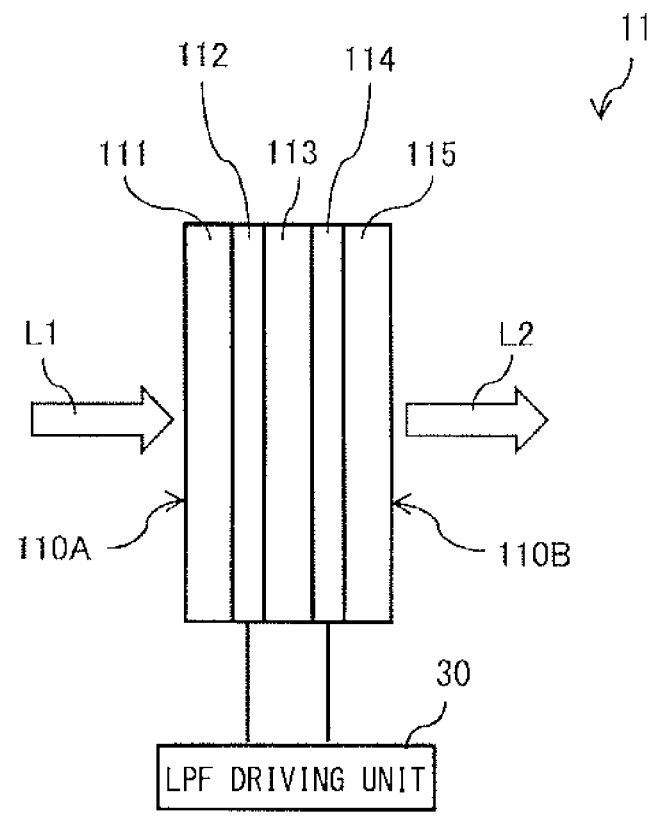
[ FIG. 5 ]
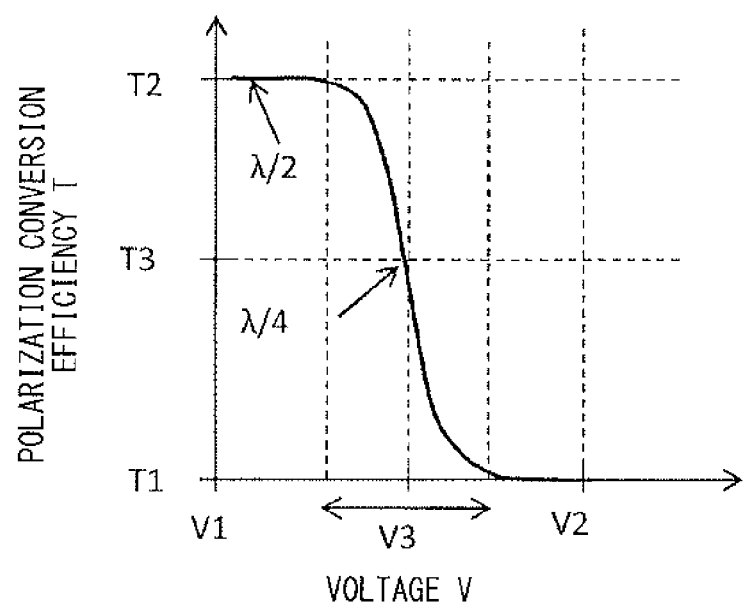

[ FIG. 6A ]
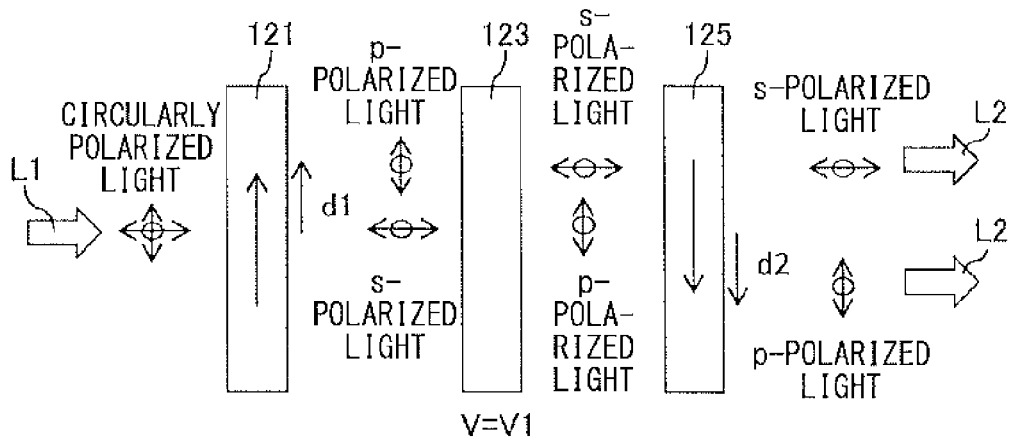
[ FIG. 6B ]
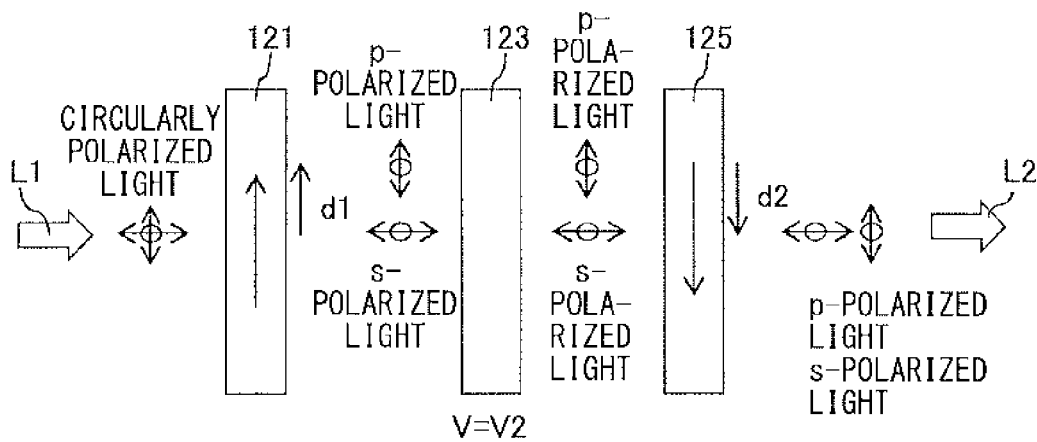
[ FIG. 6C ]
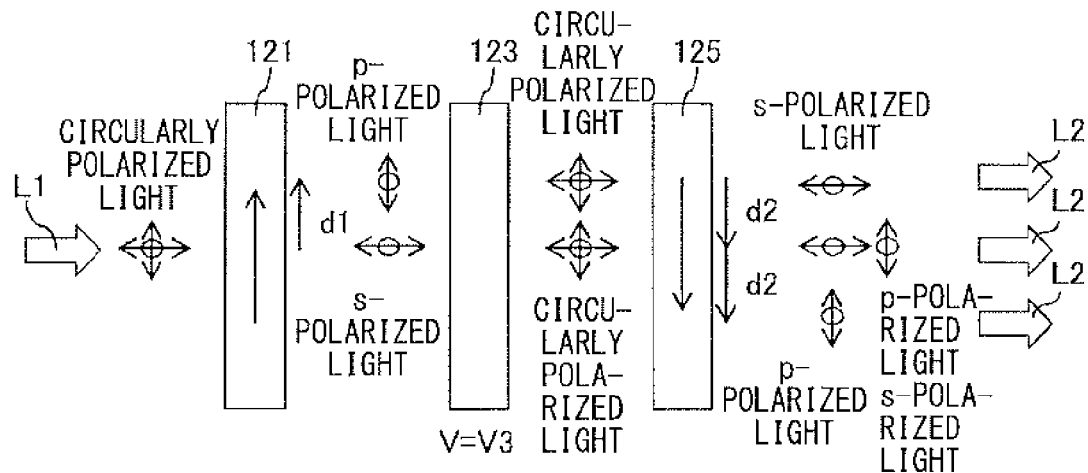

[ FIG. 7 ]
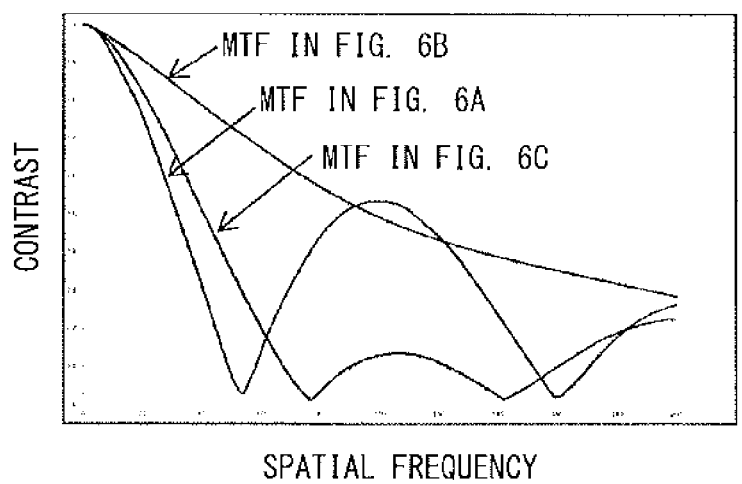
[ FIG. 8 ]
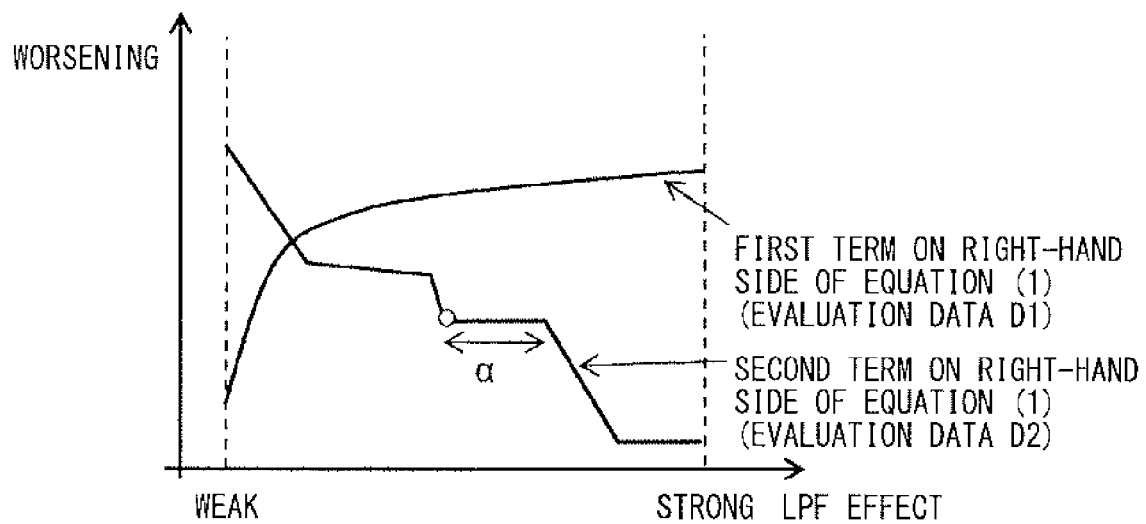

[FIG. 9]
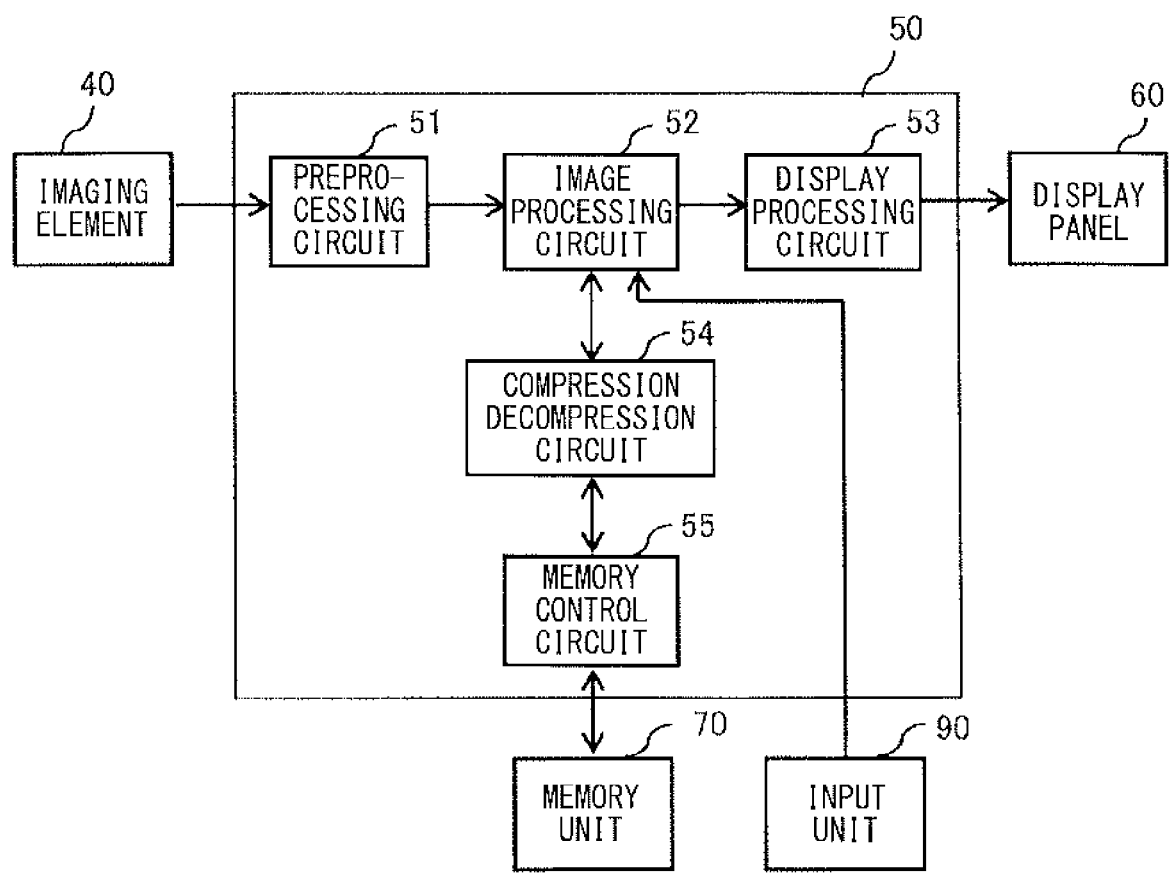

[ FIG. 10 ]
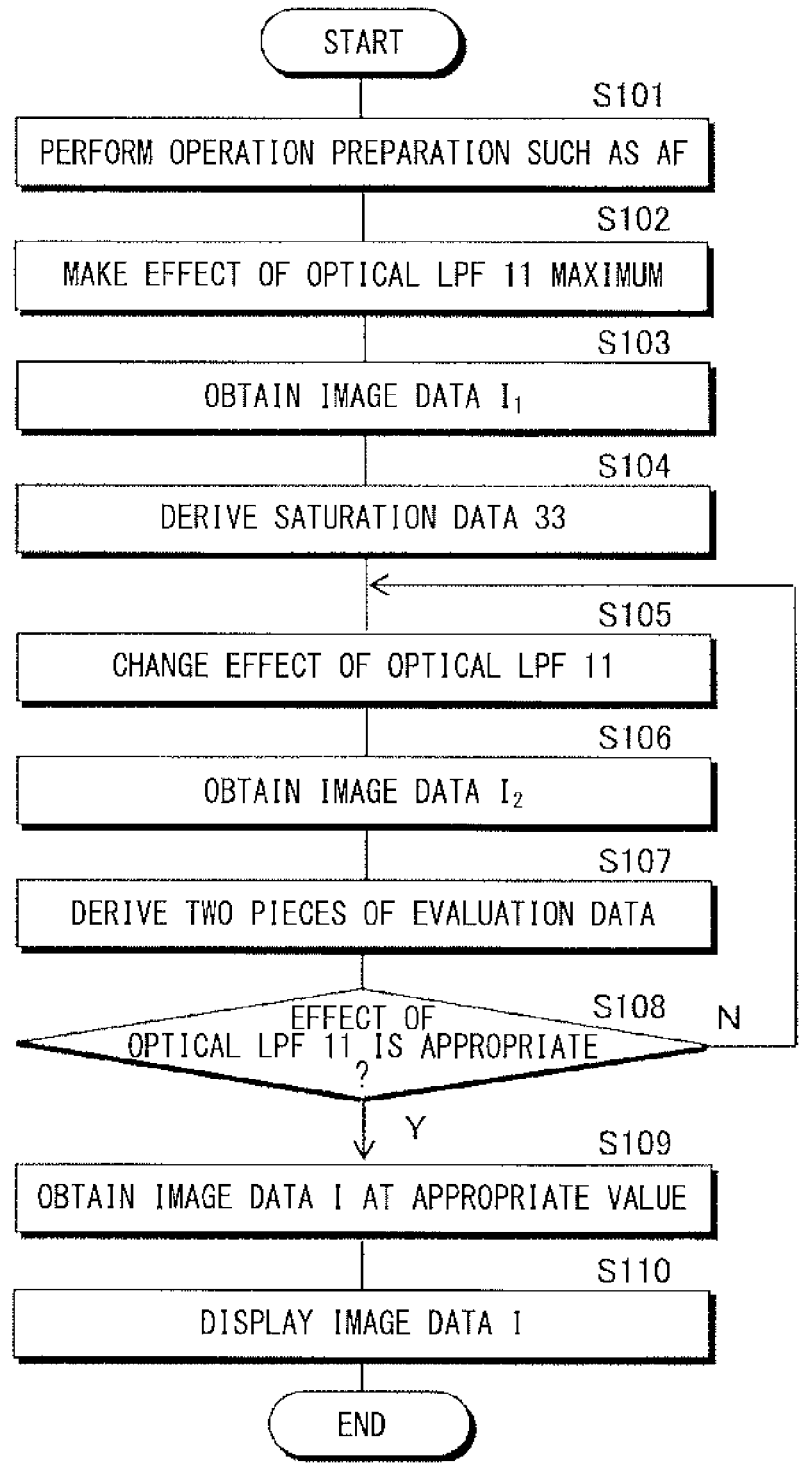

[FIG. 11]
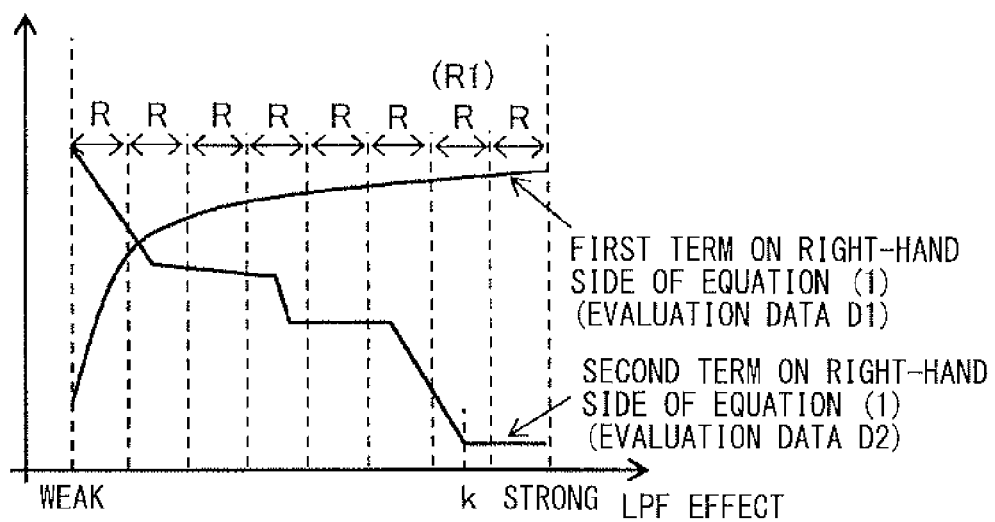

[ FIG. 12 ]
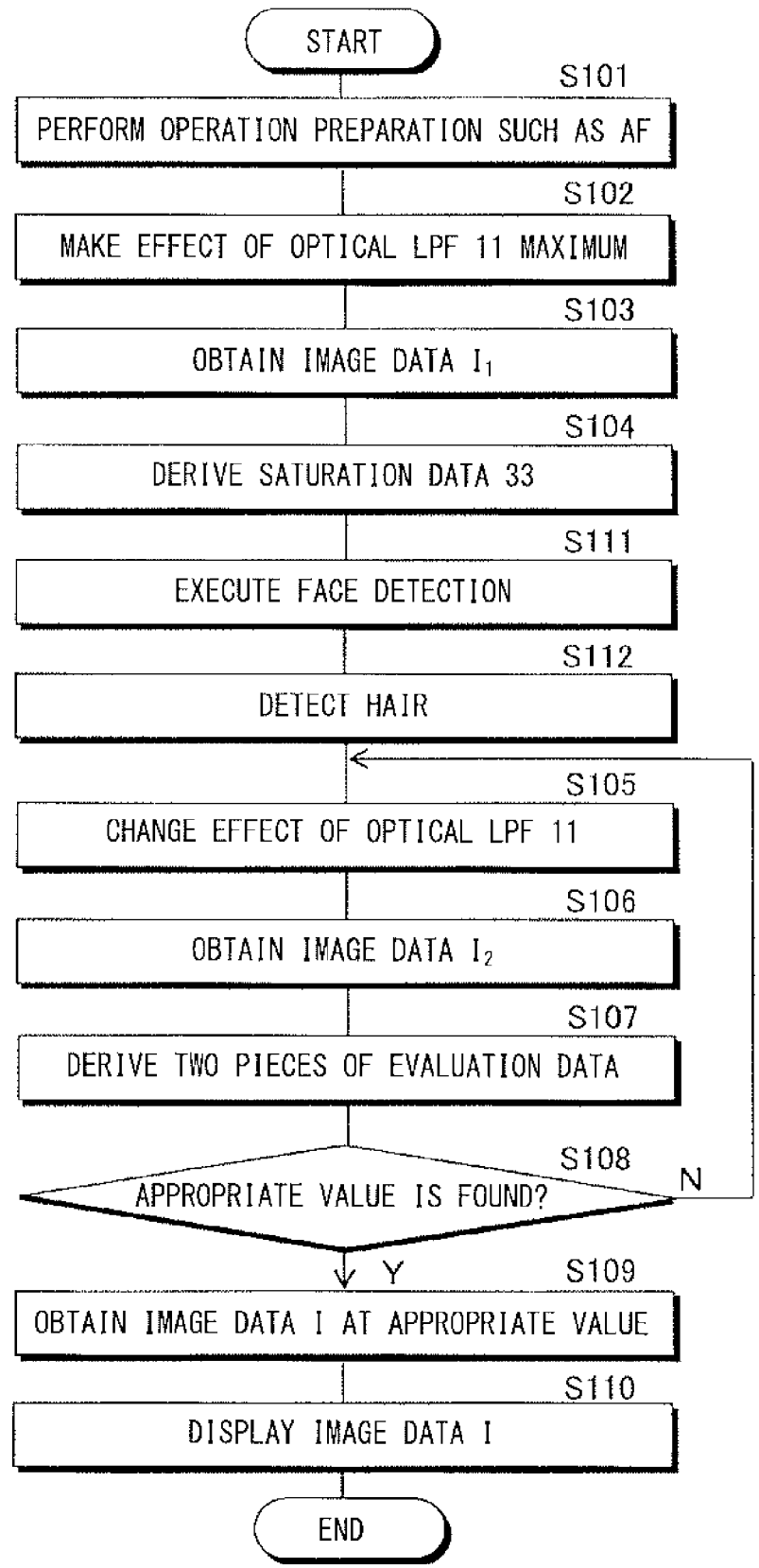

[ FIG. 13 ]
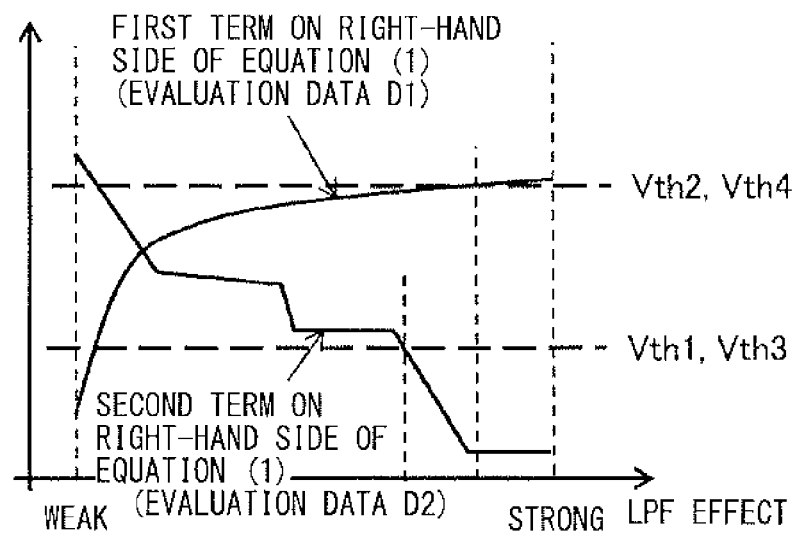

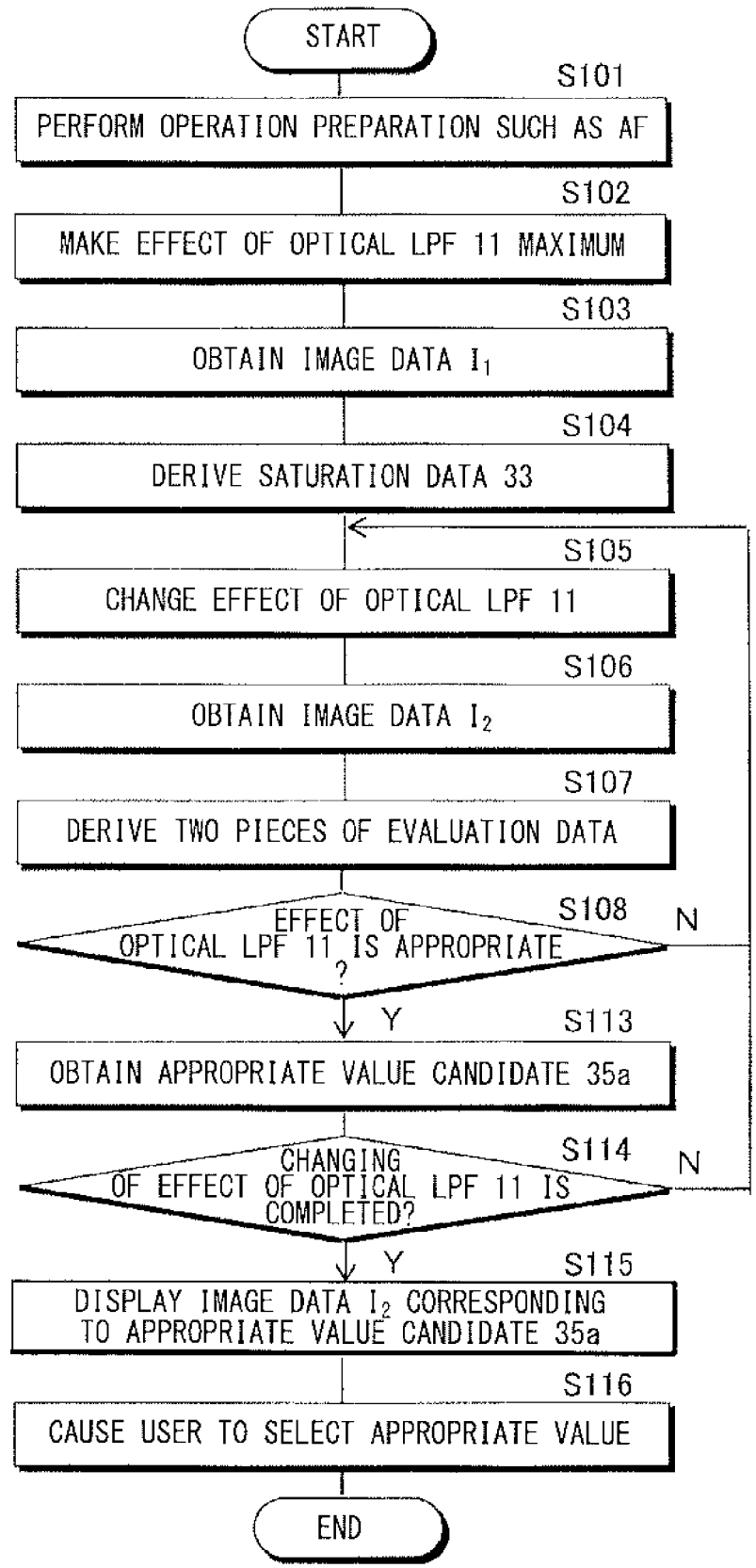
[ FIG. 14 ]

[ FIG. 15 ]
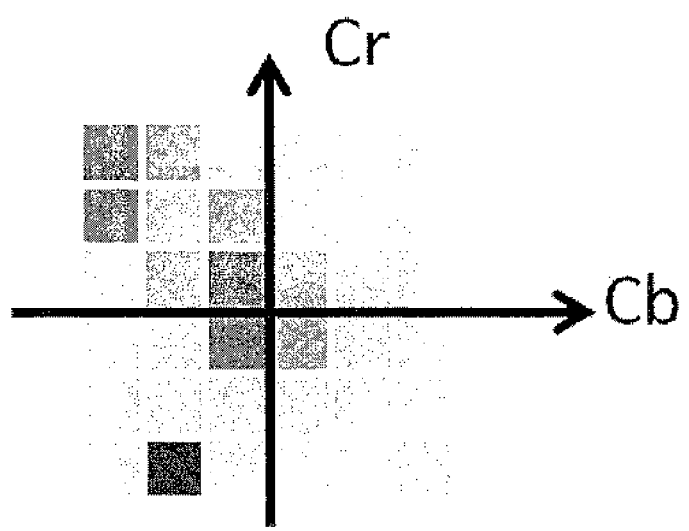

[ FIG. 16 ]
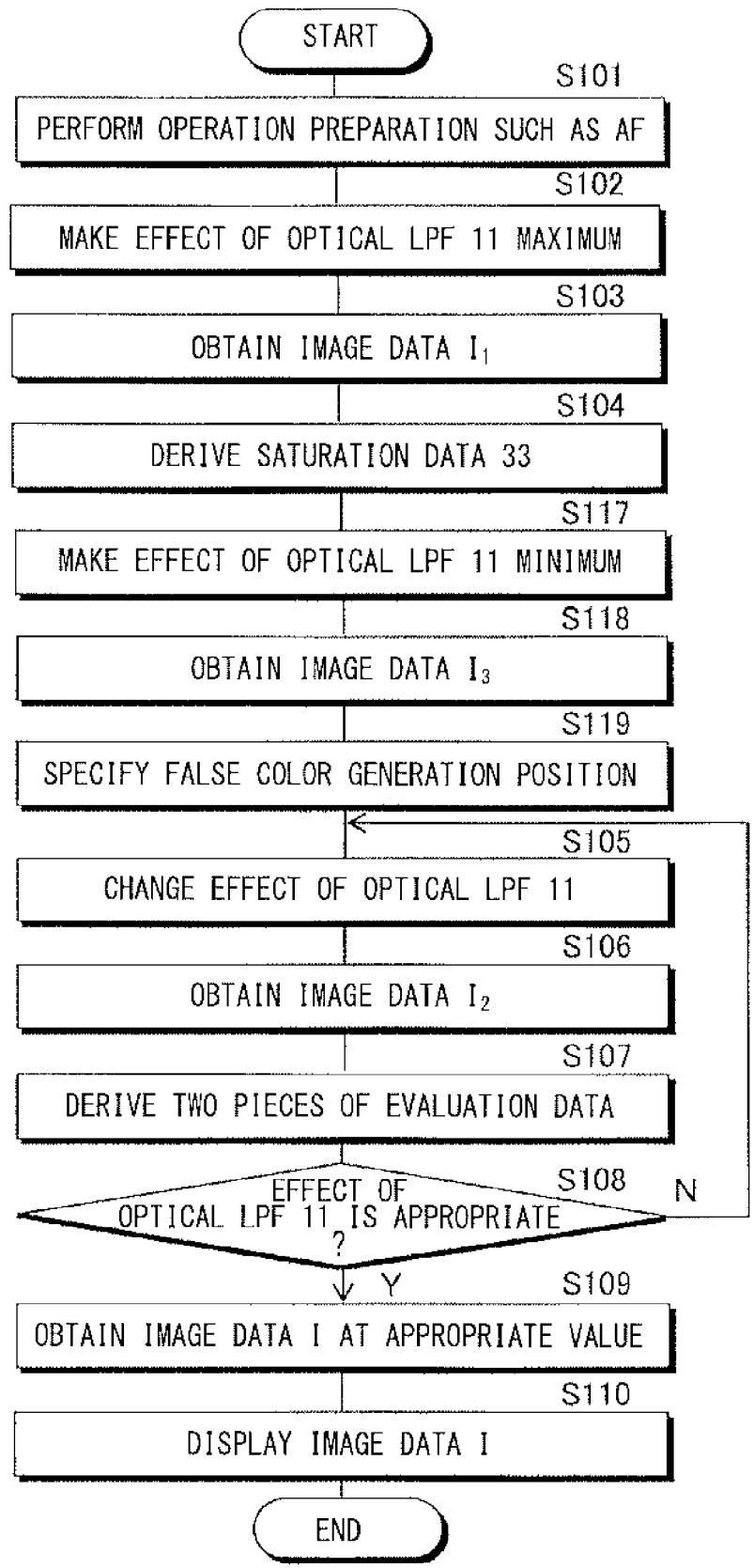

[ FIG. 17 ]
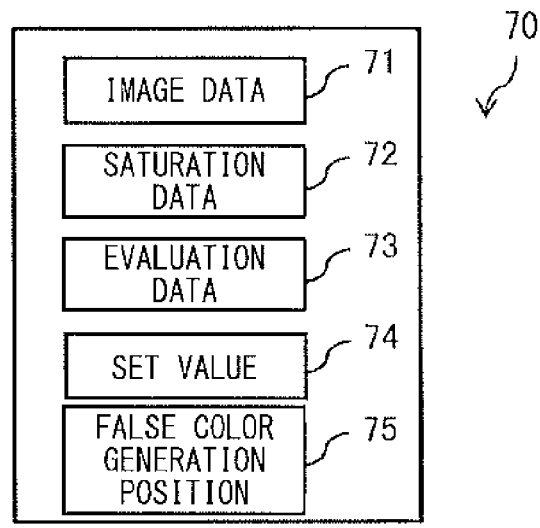
[ FIG. 18 ]
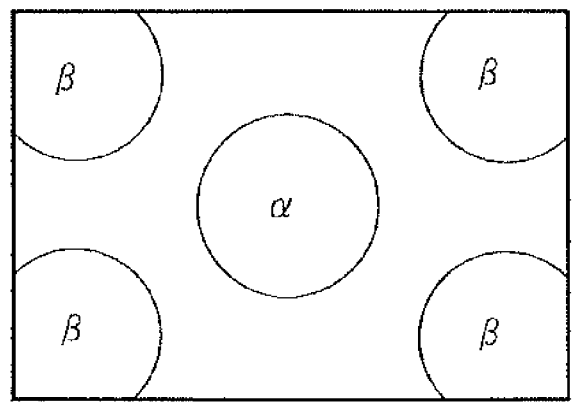
[ FIG. 19 ]
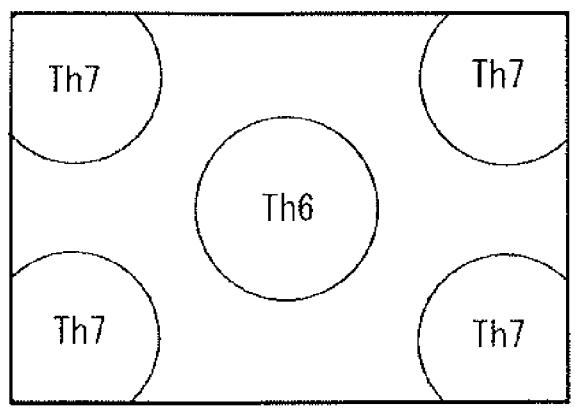

[ FIG. 20 ]
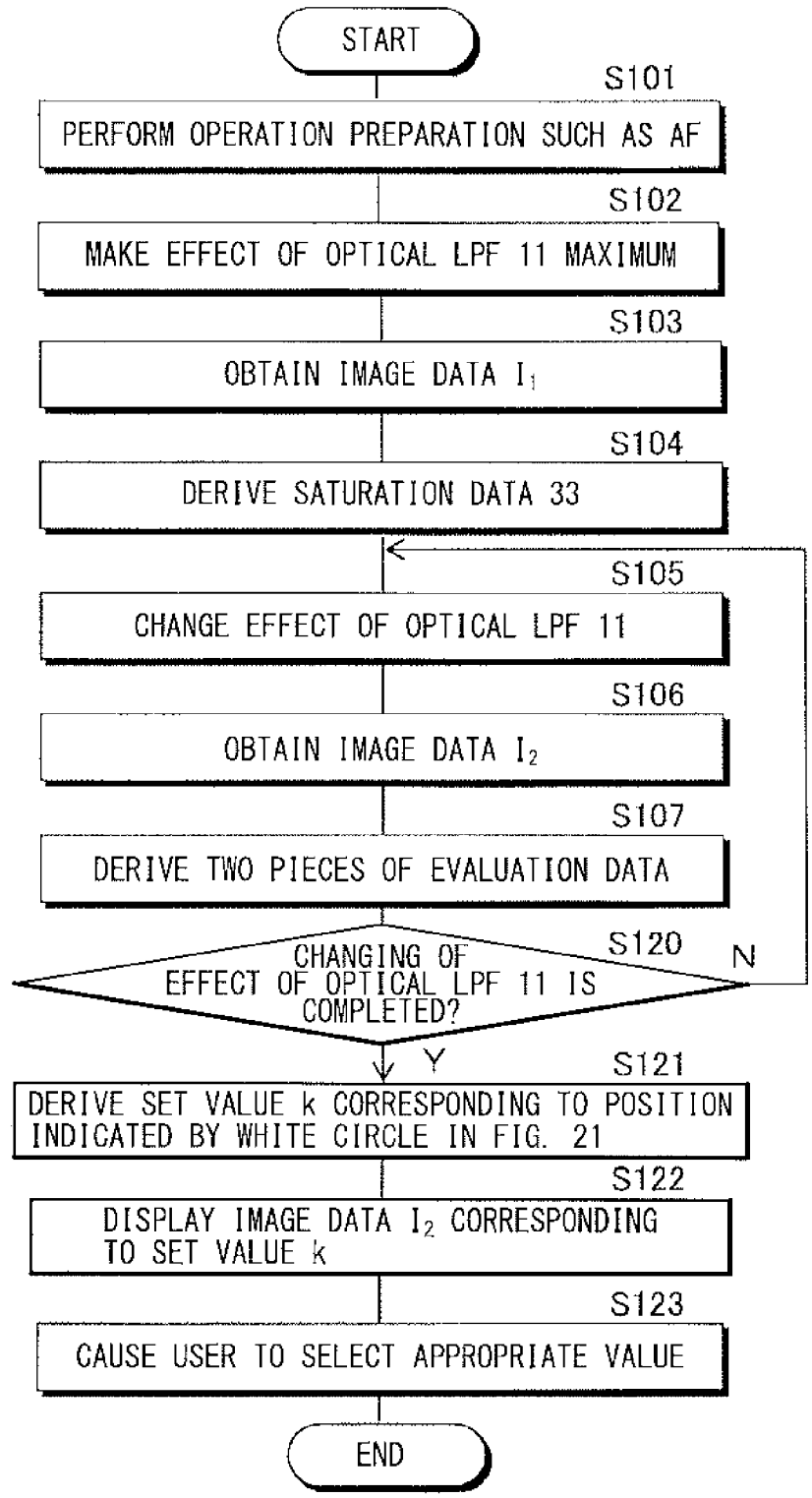

[ FIG. 21 ]
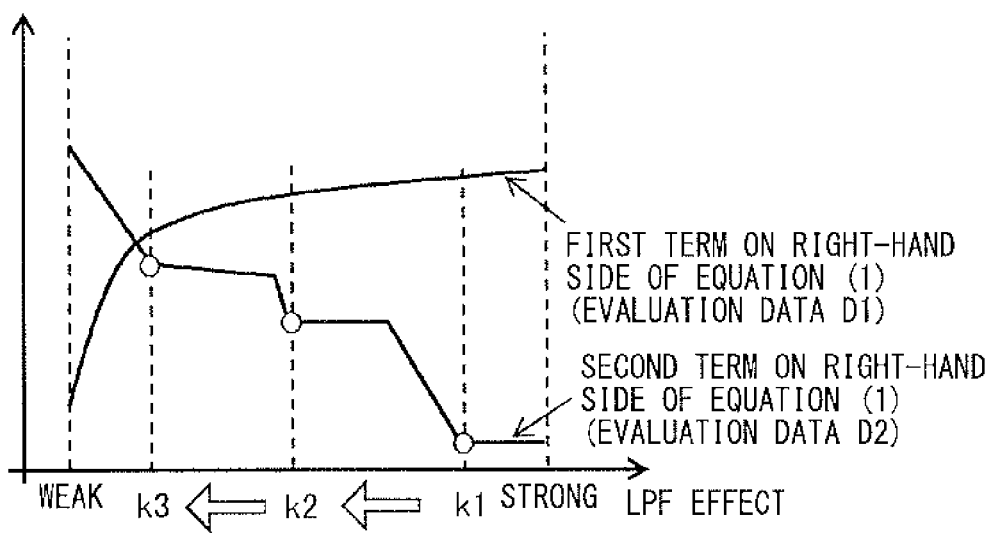
[ FIG. 22 ]
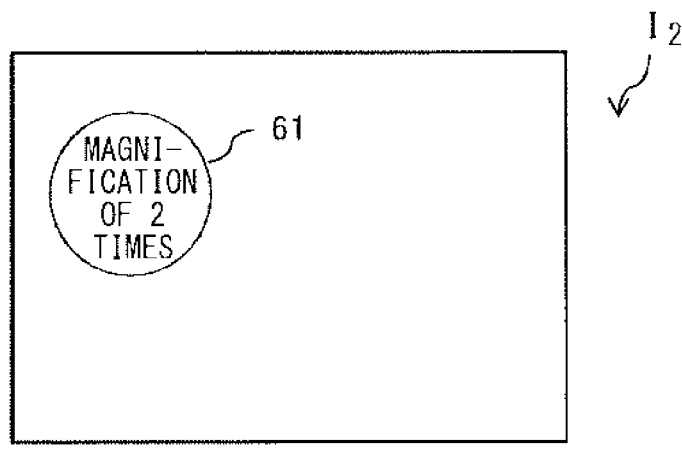

[ FIG. 23 ]
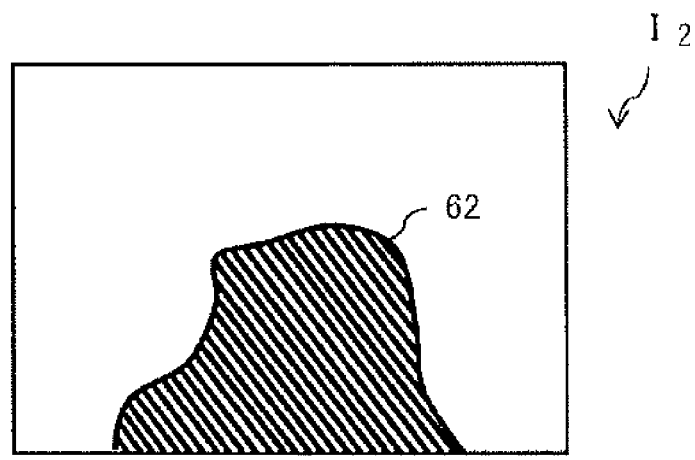
[ FIG. 24 ]
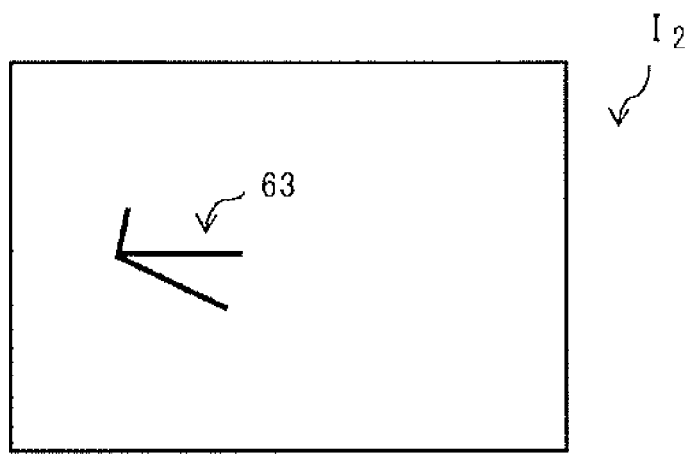

[ FIG. 25 ]
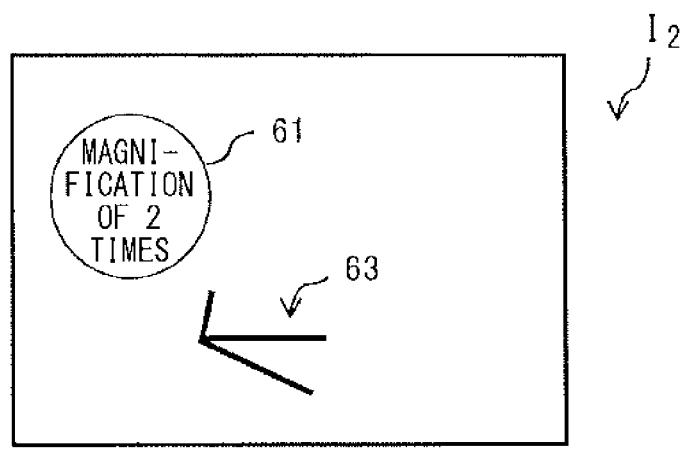
[ FIG. 26 ]
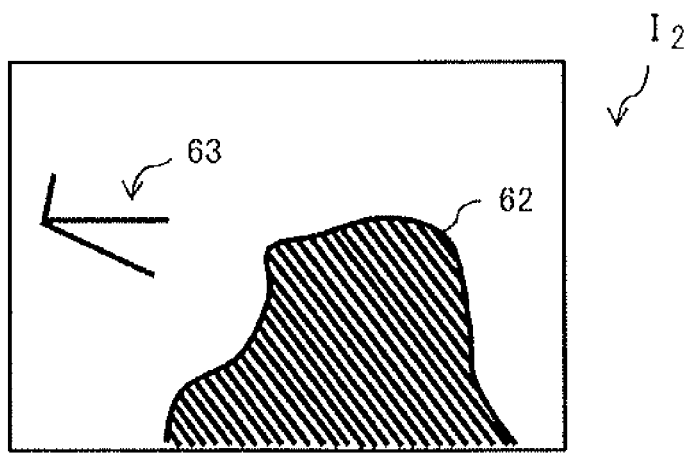

[ FIG. 27 ]
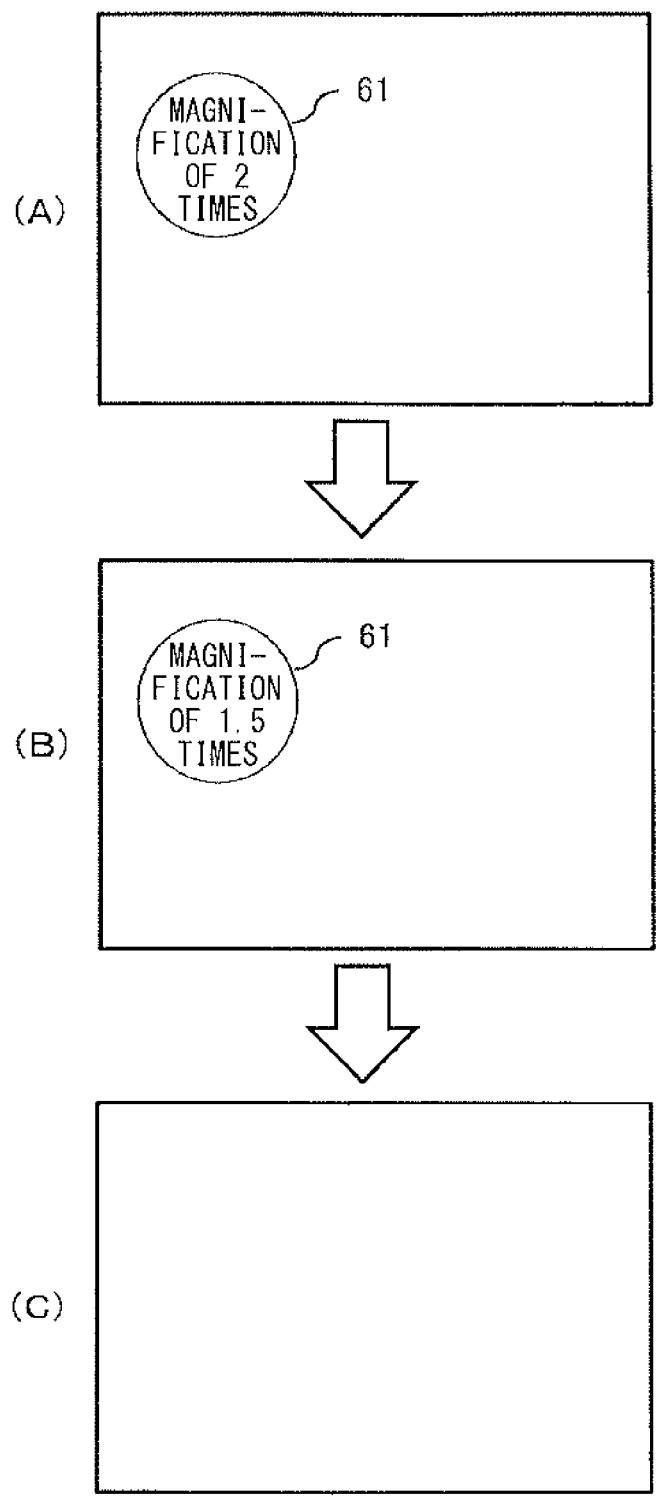

[ FIG. 28 ]
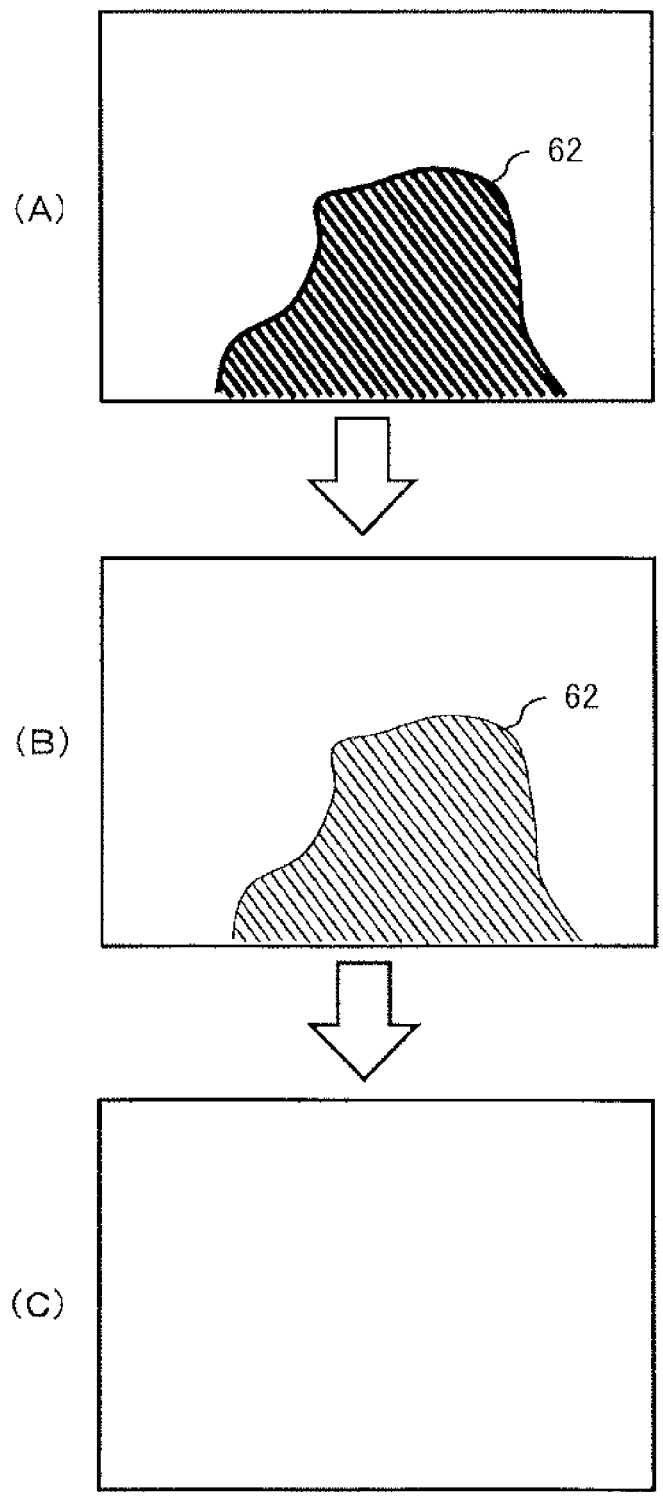

[FIG. 29]
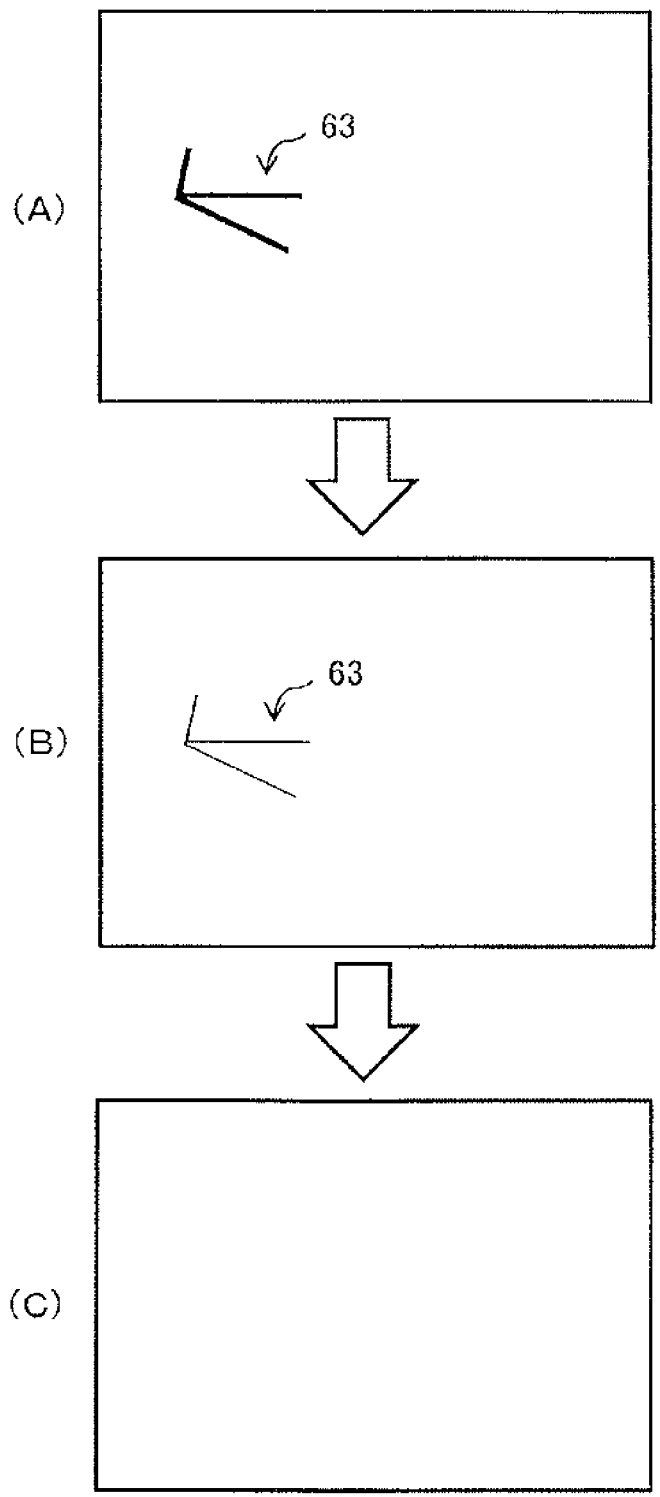

[ FIG. 30 ]
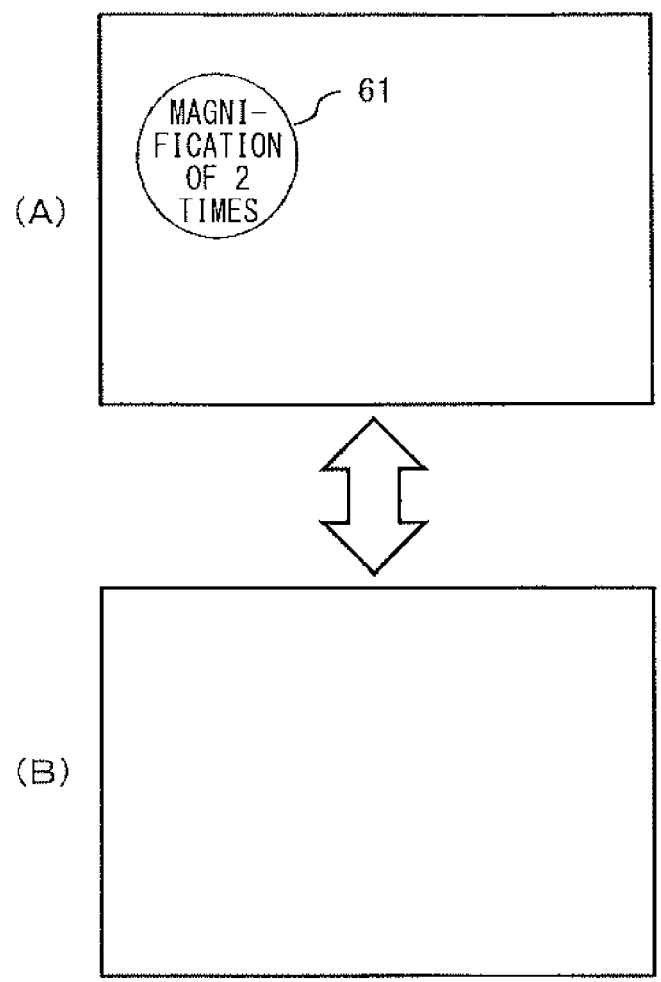

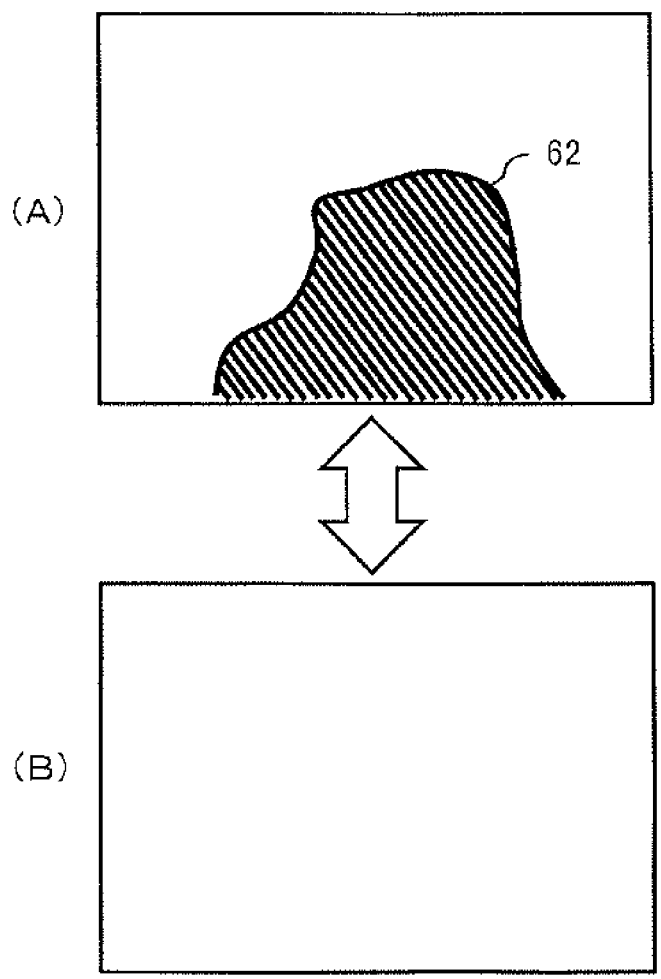
[FIG. 31]

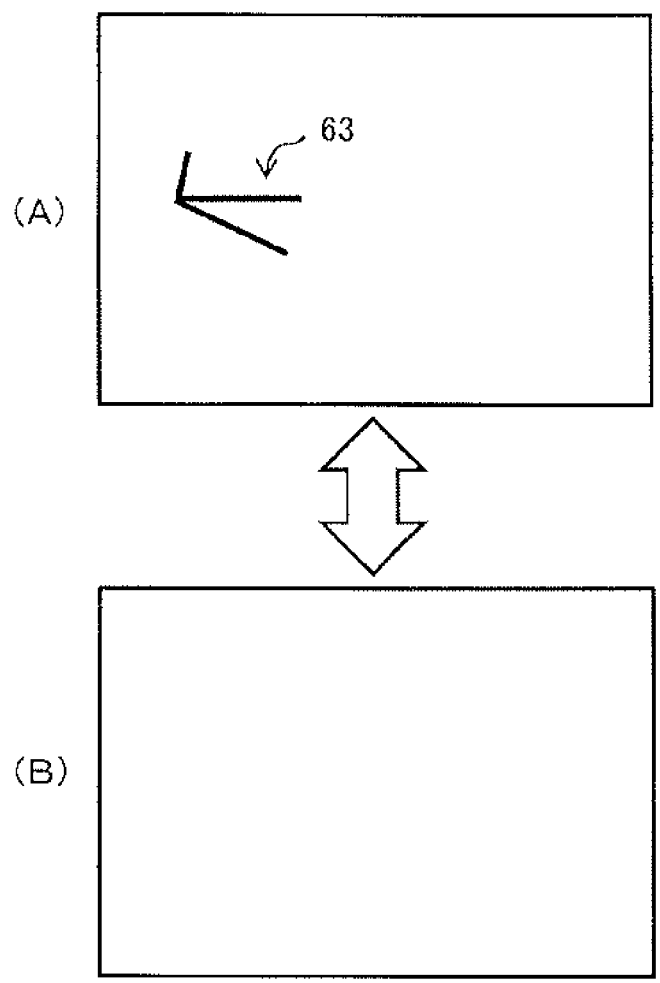
[ FIG. 32 ]

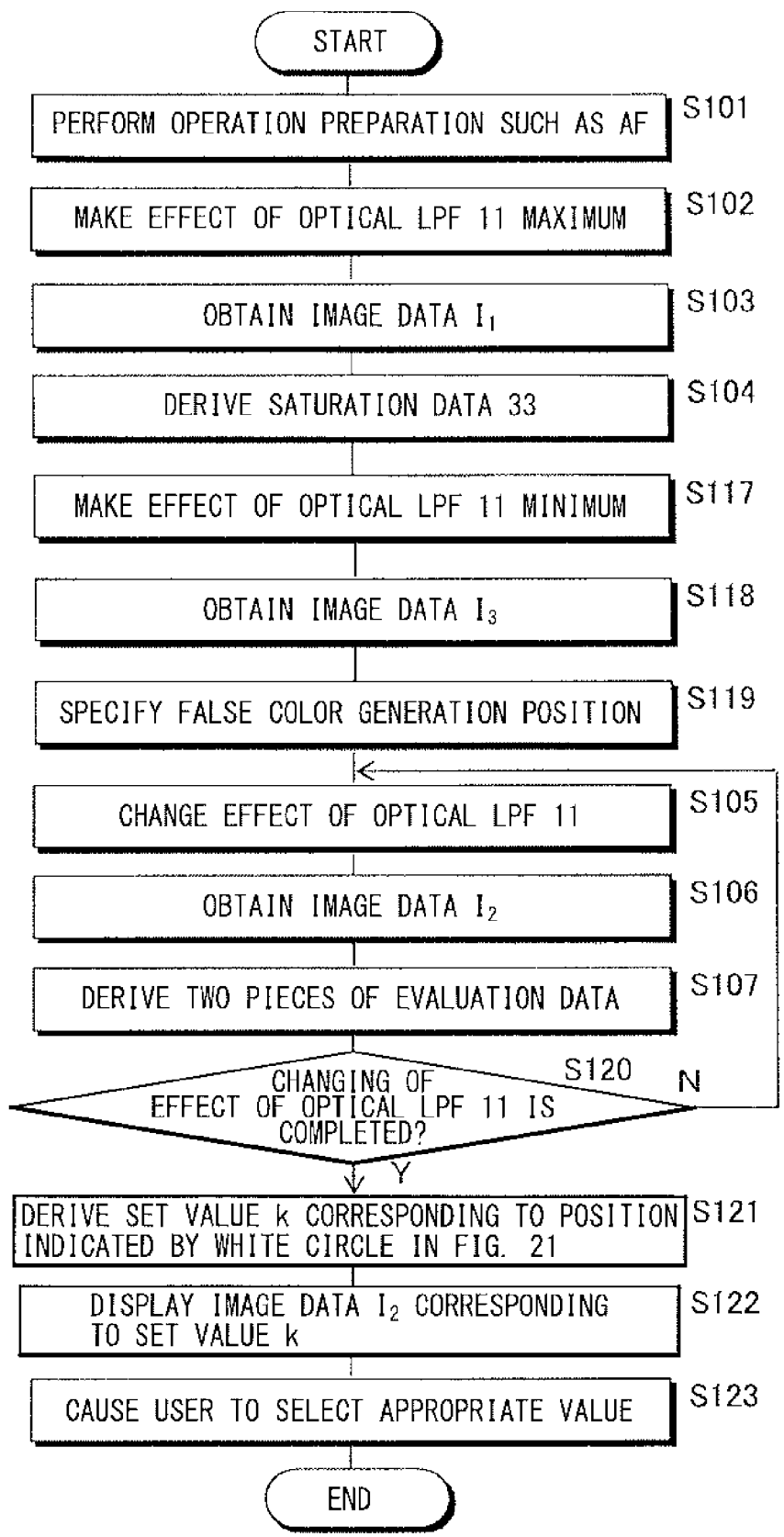
[ FIG. 33 ]

DISPLAY CONTROL APPARATUS AND IMAGING APPARATUS

TECHNICAL FIELD

The present disclosure relates to a display control apparatus and an imaging apparatus.

BACKGROUND ART

In a case where a typical single-plate digital camera uses a Bayer coding imager, it is necessary to restore lost information through performing demosaicing processing on image data obtained by the imager. However, it is difficult to fully derive the lost information in principle, which unavoidably causes a decline in resolution and occurrence of artifacts.

It is therefore considered to provide a lowpass filter between a lens and the imager. In such a case, adjusting an effect of the lowpass filter makes it possible to reduce false color that is one of the artifacts. It is to be noted that, for example, an optical lowpass filter disclosed in the following PTL 1 is usable as a lowpass filter that reduces moire.

CITATION LIST

Patent Literature

PTL 1: Japanese Unexamined Patent Application Publication No. 2006-08045

SUMMARY OF THE INVENTION

Incidentally, there is a need for manual setting of a lowpass filter by a user himself. In this case, the user adjusts the effect of the lowpass filter while looking into a viewfinder to confirm presence or absence of false color generated in a taken image, or the like. However, a screen of the viewfinder is not so large, which causes an issue that it is not easy to confirm presence or absence of false color generated in the taken image. It is desirable to provide a display control apparatus and an imaging apparatus that are able to easily confirm presence or absence of false color generated in a taken image even on a not-so-large screen.

A display control apparatus according to an embodiment of the present disclosure includes a display controller that performs enhancement on a region where resolution is changed in response to changing of lowpass characteristics or a region where false color is generated or changed in response to changing of the lowpass characteristics in image data generated on the basis of light incident via a lowpass filter.

An imaging apparatus according to an embodiment of the present disclosure includes an imaging element that generates image data on the basis of light incident via a lowpass filter. The imaging apparatus further includes a display controller that performs enhancement on a region where resolution is changed in response to changing of lowpass characteristics or a region where false color is generated or changed in response to changing of the lowpass characteristics in the image data generated by the imaging element.

In the display control apparatus and the imaging apparatus according to the embodiments of the present disclosure, enhancement is performed on the region where resolution is changed in response to changing of the lowpass characteristics or the region where false color is generated or changed in response to changing of the lowpass characteristics in the image data generated by the imaging element. This makes it possible for a user to easily visually recognize a position where a decline in image quality that is one of deterioration in resolution and false color occurs.

According to the display control apparatus and the imaging apparatus of the embodiments of the present disclosure, enhancement is performed on the region where resolution is changed in response to changing of the lowpass characteristics or the region where false color is generated or changed in response to changing of the lowpass characteristics in the image data generated by the imaging element, which makes it possible for the user to easily visually recognize a position where a decline in image quality that is one of deterioration in resolution and false color occurs. As a result, it is possible for the user to easily confirm presence or absence of false color generated in a taken image, or the like even on a not-so-large screen. It is to be noted that effects of the present disclosure are not specifically limited to the effects described here, and may be any of effects described in the description.

BRIEF DESCRIPTION OF THE DRAWINGS

FIG. 1 is a diagram illustrating an example of a schematic configuration of an imaging apparatus according to an embodiment of the present disclosure.

FIG. 2 is a diagram illustrating an example of a schematic configuration of a light reception surface of an imaging device in FIG. 1.

FIG. 3 is a diagram illustrating an example of data stored in a memory unit in FIG. 1.

FIG. 4 is a diagram illustrating an example of a schematic configuration of a variable optical LPF (Low Pass Filter) in FIG. 1.

FIG. 5 is a diagram illustrating an example of a polarization conversion efficiency curve (V-T curve) of a liquid crystal layer in FIG. 4.

FIG. 6A is a diagram illustrating an example of workings of the variable optical LPF in FIG. 5.

FIG. 6B is a diagram illustrating an example of workings of the variable optical LPF in FIG. 5.

FIG. 6C is a diagram illustrating an example of workings of the variable optical LPF in FIG. 5.

FIG. 7 is a diagram illustrating an example of an MTF (Modulation Transfer Function) in each of FIGS. 6A to 6C.

FIG. 8 is a diagram illustrating an example of evaluation data.

FIG. 9 is a diagram illustrating an example of a schematic configuration of an image processor in FIG. 1.

FIG. 10 is a diagram illustrating an example of an imaging procedure in the imaging apparatus in FIG. 1.

FIG. 11 is a diagram illustrating an example of the evaluation data.

FIG. 12 is a diagram illustrating an example of the imaging procedure in the imaging apparatus in FIG. 1.

FIG. 13 is a diagram illustrating an example of the evaluation data.

FIG. 14 is a diagram illustrating an example of the imaging procedure in the imaging apparatus in FIG. 1.

FIG. 15 is a diagram illustrating an example of a histogram.

FIG. 16 is a diagram illustrating an example of the imaging procedure in the imaging apparatus in FIG. 1.

FIG. 17 is a diagram illustrating an example of data stored in the memory unit in FIG. 1.

FIG. 18 is a diagram illustrating an example of false color generation positions to which correction factors α and β are applied.

FIG. 19 is a diagram illustrating an example of false color generation positions to which threshold values Th6 and Th7 are applied.

FIG. 20 is a diagram illustrating an example of the imaging procedure in the imaging apparatus in FIG. 1.

FIG. 21 is a diagram illustrating an example of the evaluation data.

FIG. 22 is a diagram illustrating a state in which a portion of image data is enlarged.

FIG. 23 is a diagram illustrating a state in which a portion of image data is subjected to zebra processing.

FIG. 24 is a diagram illustrating a state in which a portion of image data is highlighted.

FIG. 25 is a diagram illustrating a state in which a portion of image data is enlarged and highlighted.

FIG. 26 is a diagram illustrating a state in which a portion of image data is enlarged and subjected to zebra processing.

FIG. 27 is a diagram illustrating a state in which a magnification of a portion of image data is changed.

FIG. 28 is a diagram illustrating a state in which a shade of a zebra pattern in a portion of image data is changed.

FIG. 29 is a diagram illustrating a state in which a thickness of a highlight in a portion of image data is changed.

FIG. 30 is a diagram illustrating a state in which a magnification of a portion of image data is changed.

FIG. 31 is a diagram illustrating a state in which a shade of a zebra pattern in a portion of image data is changed.

FIG. 32 is a diagram illustrating a state in which a thickness of a highlight in a portion of image data are changed.

FIG. 33 is a diagram illustrating an example of the imaging procedure in the imaging apparatus in FIG. 1.

MODES FOR CARRYING OUT THE INVENTION

In the following, some embodiments of the present disclosure are described in detail with reference to the drawings. It is to be noted that description is given in the following order.
1. Embodiment
2. Modification Examples

1. Embodiment

[Configuration]

FIG. 1 illustrates an example of a schematic configuration of an imaging apparatus according to an embodiment of the present disclosure. The imaging apparatus 1 includes, for example, an imaging optical system 10, a lens driving unit 20, an LPF driving unit 30, an imaging element 40, and an image processor 50. The imaging apparatus 1 further includes, for example, a display panel 60, a memory unit 70, a controller 80, and an operation unit 90.

(Imaging Optical System 10)

The imaging optical system 10 includes, for example, a variable optical LPF (Low Pass Filter) 11 and a lens 12. The lens 12 forms an optical subject image on the imaging element 40. The lens 12 includes a plurality of lenses, and is driven by the lens driving unit 20, thereby allowing at least one lens to be moved. Thus, the lens 12 allows for optical focus adjustment and zoom adjustment. The variable optical LPF 11 removes a high spatial frequency component included in light, and is driven by the LPF driving unit 30 to change a cut-off frequency fc that is one of lowpass characteristics. The imaging optical system 10 may be integrated with the imaging element 40 into one body, or may be configured separately from the imaging element 40. Moreover, the variable optical LPF 11 in the imaging optical system 10 may be integrated with the imaging element 40 into one body, or may be configured separately from the imaging element 40. A specific configuration of the variable optical LPF 11 and a method of modulating the cut-off frequency fc are described in detail later.

(Lens Driving Unit 20 and LPF Driving Unit 30)

The lens driving unit 20 drives at least one lens in the lens 12 for optical zoom magnification, focus adjustment, and the like in accordance with an instruction from the controller 80. The LPF driving unit 30 performs control to change the lowpass characteristic (the cut-off frequency fc) of the variable optical LPF 11 in accordance with an instruction from the controller 80, thereby adjusting an effect of the variable optical LPF 11. The "effect of the variable optical LPF 11" indicates reduction in a component that is included in light and has a higher spatial frequency than a Nyquist frequency. For example, the LPF driving unit 30 applies a predetermined voltage V (constant frequency) between electrodes of the variable optical LPF 11 to adjust the cut-off frequency fc of the variable optical LPF 11.

(Imaging Element 40)

The imaging element 40 converts, into an electrical signal, a subject image formed on the light reception surface 40A via the lens 12 and the variable optical LPF 11 to generate image data. The imaging element 40 includes, for example, a CCD (Charge Coupled Device) or a CMOS (Complementary Metal Oxide Semiconductor) image sensor.

The imaging element 40 has the light reception surface 40A on which a plurality of photoelectric converters 40B are two-dimensionally arranged at predetermined intervals. The imaging element 40 further includes, for example, a color filter array 40C on the light reception surface 40A. FIG. 2 exemplifies a state in which the color filter array 40C has a Bayer arrangement in which 2×2 arrays of R, G, G, and B are arranged in a matrix. The color filter array 40C may have a different arrangement from the Bayer arrangement. The imaging element 40 generates image data on the basis of light incident via the variable optical LPF 11. The imaging element 40 spatially samples light incident via the lens 12 and the variable optical LPF 11 to generate color image data. The image data includes color signals, per pixel, of respective colors included in the color filter array 40C.

(Image Processor 50)

The image processor 50 performs, on the image data generated by the imaging element, image processing such as white balance, demosaicing, gray-scale conversion, color conversion, and noise reduction. The image processor 50 performs processing such as conversion of image data into display data suitable for display on the display panel 60 and conversion of image data into data suitable for recording on the memory unit 70. Image processing in the image processor 50 is described in detail later.

(Display Panel 60, Memory Unit 70, and Operation Unit 90)

The display panel 60 includes, for example, a liquid crystal panel. The display panel 60 displays display data inputted from the image processor 50, and the like. The memory unit 70 is allowed to hold shot image data, various kinds of programs, etc. The memory unit 70 includes, for example, a nonvolatile memory. The memory unit 70 includes, for example, an EEPROM (Electrically Erasable Programmable Read-Only Memory), a flash memory, a resistive random access memory, etc. The memory unit 70 may be an external memory that is attachable to and detachable from the imaging apparatus 1. The memory unit 70 holds, for example, various kinds of data generated by the image processor 50 and various kinds of data inputted from the operation unit 90, as illustrated in FIG. 3. FIG. 3 illustrates an example of data stored in the memory unit 70. Examples of the data stored in the memory unit 70 include image data 71, saturation data 72, evaluation data 73, and a set value 74, as illustrated in FIG. 3. The image data 71, the saturation data 72, the evaluation data 73, and the set value 74 are described in detail later. The operation unit 90 receives an instruction from a user, and includes, for example, an operation button, a shutter button, an operation dial, a keyboard, a touch panel, etc.

(Controller 80)

The controller 80 is a processor that controls the lens driving unit 20, the LPF driving unit 30, the imaging element 40, the image processor 50, the display panel 60, and the memory unit 70. The controller 80 controls the lens driving unit 20 to perform optical zoom magnification, focus adjustment, etc. of the lens 12. The controller 80 controls the LPF driving unit 30 to adjust the effect (the cut-off frequency fc) of the variable optical LPF 11. The controller 80 further drives the imaging element 40 to cause the imaging element 40 to generate image data and output the generated image data to the image processor 50. The controller 80 controls the image processor 50 to cause the image processor 50 to perform the above-described image processing and output various kinds of data obtained as a result of the above-described image processing to the memory unit 70 and the display panel 60. The controller 80 controls the lens driving unit 20, the LPF driving unit 30, the imaging element 40, the image processor 50, and the display panel 60 in accordance with various kinds of data inputted from the operation unit 90, and stores various kinds of data inputted from the operation unit 90 in the memory unit 70.

(Variable Optical LPF 11)

Next, the variable optical LPF 11 is described in detail. FIG. 4 illustrates an example of a schematic configuration of the variable optical LPF 11. The variable optical LPF 11 removes a high spatial frequency component included in light. The variable optical LPF 11 is driven by the LPF driving unit 30 to change the effect (the cut-off frequency fc) of the variable optical LPF 11. The variable optical LPF 11 changes the cut-off frequency fc by, for example, a peak value modulation method. It is to be noted that the peak value modulation method is described in detail later.

The variable optical LPF 11 includes a pair of birefringent plates 111 and 115 each having birefringence and a liquid crystal layer 113 disposed between the pair of birefringent plates 111 and 115. The variable optical LPF 11 further includes electrodes 112 and 114 that apply an electric field to the liquid crystal layer 113. It is to be noted that the variable optical LPF 11 may include, for example, an alignment film that regulates alignment of the liquid crystal layer 113. The electrodes 112 and 114 faces each other with the liquid crystal layer 113 in between. Each of the electrodes 112 and 114 includes one sheet electrode. It is to be noted that one or both of the electrode 112 and the electrode 114 may include a plurality of partial electrodes.

The electrodes 112 and 114 each are a light-transmissive conductive film including ITO (Indium Tin Oxide), etc. The electrodes 112 and 114 each may be an inorganic conductive film having light transmittance, an organic conductive film having light transmittance, or a metal oxide film having light transmittance. The birefringent plate 111 is disposed on a light incident side of the variable optical LPF 11, and an outside surface of the birefringent plate 111 serves as a light incident surface 110A. The incident light L1 is light entering the light incident surface 110A from a subject side. The birefringent plate 111 is disposed to allow an optical axis of the incident light L1 to be parallel to a normal to the birefringent plate 111 (or the light incident surface 110A), for example. The birefringent plate 115 is disposed on a light exit side of the variable optical LPF 11, and an outside surface of the birefringent plate 115 serves as a light exit surface 110B. Transmitted light L2 from the variable optical LPF 11 is light outputted from the light exit surface 110B to outside. The birefringent plate 111, the electrode 112, the liquid crystal layer 113, the electrode 114, and the birefringent plate 115 are stacked in this order from the light incident side.

The birefringent plates 111 and 115 each have birefringence, and have a uniaxial crystal structure. The birefringent plates 111 and 115 each have a function of performing ps separation on circularly polarized light with use of birefringence. The birefringent plates 111 and 115 each include, for example, quartz crystal, calcite, or lithium niobate.

In the birefringent plates 111 and 115, separation directions of an image are oriented opposite to each other. An optical axis AX1 of the birefringent plate 111 and an optical axis AX2 of the birefringent plate 115 intersect with each other in a plane parallel to the normal to the light incident surface 10A. An angle formed by the optical axis AX1 and the optical axis AX2 is, for example, 90°. Further, the optical axes AX1 and AX2 obliquely intersect with the normal to the light incident surface 10A. An angle formed by the optical axis AX1 and the normal to the light incident surface 110A is, for example, smaller than 90° in a counterclockwise direction with reference to the normal to the light incident surface 110A, and is, for example, 45°. An angle formed by the optical axis AX2 and the normal to the light incident surface 110A is, for example, larger than 90° and smaller than 180° in the counterclockwise direction with reference to the normal to the light incident surface 110A, and is, for example, 135° (=180°−45°).

FIG. 5 illustrates an example of a polarization conversion efficiency curve (V-T curve) of the liquid crystal layer 113. In FIG. 5, a horizontal axis indicates the voltage V (the constant frequency) applied between the electrodes 112 and 114. In FIG. 5, a vertical axis indicates polarization conversion efficiency T. The polarization conversion efficiency T is obtained through multiplying, by 100, a value that is obtained through dividing a phase difference applied to linearly polarized light by 90°. The polarization conversion efficiency T being 0% indicates that no phase difference is applied to the linearly polarized light, and indicates, for example, that the linearly polarized light passes through a medium without changing a polarization direction thereof. The polarization conversion efficiency T being 100% indicates that a phase difference of 90° is applied to the linearly polarized light, and indicates, for example, that p-polarized light is converted into s-polarized light or s-polarized light is converted into p-polarized light and then the s-polarized light or the p-polarized light passes through a medium. The polarization conversion efficiency T being 50% indicates that a phase difference of 45° is applied to the linearly polarized light, and indicates, for example, that p-polarized light or s-polarized light is converted into circularly polarized light and then the circularly polarized light passes through a medium.

The liquid crystal layer 113 controls polarized light on the basis of an electric field generated by a voltage between the electrodes 112 and 114. As illustrated in FIG. 5, in the liquid crystal layer 113, the polarization conversion efficiency T becomes T2 upon application of a voltage V1 between the electrodes 112 and 114, and the polarization conversion efficiency T becomes T1 upon application of a voltage V2 (V1<V2) between the electrodes 112 and 114. T2 is 100%, and T1 is 0%. Moreover, as illustrated in FIG. 5, in the liquid crystal layer 113, the polarization conversion efficiency T becomes T3 upon application of a voltage V3 (V1<V3<V2) between the electrodes 112 and 114. T3 is a value larger than 0% and smaller than 100%. In FIG. 5, a case where the voltage V3 is a voltage in a case where T3 is 50% is illustrated as an example. Here, the voltage V1 is a voltage equal to or smaller than a voltage at a falling position of the polarization conversion efficiency curve, and specifically indicates a voltage in a section in which the polarization conversion efficiency is saturated around a maximum value of the polarization conversion efficiency curve. The voltage V2 is a voltage equal to or larger than a voltage at a rising position of the polarization conversion efficiency curve, and specifically indicates a voltage in a section in which the polarization conversion efficiency is saturated around a minimum value of the polarization conversion efficiency curve. The voltage V3 is a voltage (an intermediate voltage) between the voltage at the falling position of the polarization conversion efficiency curve and the voltage at the rising position of the polarization conversion efficiency curve.

As described above, the liquid crystal layer 113 controls polarization. Examples of a liquid crystal having the above-described polarization conversion efficiency curve may include a twisted nematic (TN) liquid crystal. The TN liquid crystal includes a chiral nematic liquid crystal, and has optical rotary power that rotates a polarization direction of passing light along rotation of the nematic liquid crystal.

Next, description is given of optical workings of the variable optical LPF 11. FIG. 6A, FIG. 6B, and FIG. 6C each illustrate an example of workings of the variable optical LPF 11. In FIG. 6A, the voltage V between the electrodes 112 and 114 is the voltage V1. In FIG. 6B, the voltage V between the electrodes 112 and 114 is the voltage V2. In FIG. 6C, the voltage V between the electrodes 112 and 114 is the voltage V3.

(Case of V=V1 (FIG. 6A))

The incident light L1 that is circularly polarized light enters the birefringent plate 111, and thereafter, the incident light L1 is separated into p-polarized light and s-polarized light by a separation width d1 by birefringence of the birefringent plate 111. In a case where a polarized component oscillating perpendicular to the optical axis AX1 of the birefringent plate 111 is an s-polarized component included in the incident light L1, the separated s-polarized light travels in straight lines in the birefringent plate 111 without being influenced by birefringence and is outputted from a back surface of the birefringent plate 111. A p-polarized component included in the incident light L1 oscillates in a direction orthogonal to an oscillating direction of the s-polarized light. Hence, the p-polarized light obliquely travels in the birefringent plate 111 under an influence of birefringence, and is refracted at a position shifted by the separation width d1 of the back surface of the birefringent plate 111, and then outputted from the back surface of the birefringent plate 111. Thus, the birefringent plate 111 separates the incident light L1 into p-polarized transmitted light L2 and s-polarized transmitted light L2 by the separation width d1.

The p-polarized light separated by the birefringent plate 111 enters the liquid crystal layer 113 of which polarization conversion efficiency is T2, and thereafter, the p-polarized light is converted into s-polarized light, and travels in straight lines in the liquid crystal layer 113 and is outputted from the back surface of the liquid crystal layer 113. The s-polarized light separated by the birefringent plate 111 enters the liquid crystal layer 113 of which polarization conversion efficiency is T2, and thereafter, the s-polarized light is converted into p-polarized light, and travels in straight lines in the liquid crystal layer 113 and is outputted from the back surface of the liquid crystal layer 113. Thus, the liquid crystal layer 113 performs ps conversion on the p-polarized light and the s-polarized light separated by the birefringent plate 111, while keeping the separation width constant.

The s-polarized light and the p-polarized light that have passed through the liquid crystal layer 113 enter the birefringent plate 115, and thereafter, the separation width of the s-polarized light and the p-polarized light is changed by the birefringence of the birefringent plate 115. In a case where a polarized component oscillating perpendicular to the optical axis AX2 of the birefringent plate 115 is s-polarized light, the s-polarized light travels in straight lines in the birefringent plate 115 without being influenced by birefringence and is outputted from the back surface of the birefringent plate 115. The p-polarized light oscillates in a direction orthogonal to the oscillating direction of the s-polarized light. Hence, under an influence of birefringence, the p-polarized light obliquely travels in the birefringent plate 115 in a direction opposite to the separation direction of the image in the birefringent plate 111. Further, the p-polarized light is refracted at a position shifted by a separation width d2 of the back surface of the birefringent plate 115 and is outputted from the back surface of the birefringent plate 115. Thus, the birefringent plate 115 separates the s-polarized light and the p-polarized light that have passed through the liquid crystal layer 113 into s-polarized transmitted light L2 and p-polarized transmitted light L2 by a separation width (d1+d2).

(Case of V=V2 (FIG. 6B))

The workings with respect to the incident light L1 of the birefringent plate 111 are the same as described above. Hence, workings of each of the liquid crystal layer 113 and the birefringent plate 115 are described below. The p-polarized light and the s-polarized light separated by the birefringent plate 111 enter the liquid crystal layer 113 of which polarization conversion efficiency is T1, and thereafter, the p-polarized light and the s-polarized light travel in straight lines in the liquid crystal layer 113 without being subjected to polarization conversion by the liquid crystal layer 113, and are outputted from the back surface of the liquid crystal layer 113. Accordingly, the liquid crystal layer 113 has no optical workings with respect to the p-polarized light and the s-polarized light separated by the birefringent plate 111.

The s-polarized light and the p-polarized light that have passed through the liquid crystal layer 113 enter the birefringent plate 115, and thereafter, the separation width of the s-polarized light and the p-polarized light is changed by the birefringence of the birefringent plate 115. In a case where a polarized component oscillating perpendicular to the optical axis AX2 of the birefringent plate 115 is the s-polarized light, the s-polarized light travels in straight lines in the birefringent plate 115 without being influenced by birefringence and is outputted from the back surface of the birefringent plate 115. The p-polarized light oscillates in a direction orthogonal to the oscillating direction of the s-polarized light. Hence, under the influence of birefringence, the p-polarized light obliquely travels in the birefringent plate 115 in a direction opposite to the separation direction of the image in the birefringent plate 111. Further, the p-polarized light is refracted at a position shifted by the separation width d2 of the back surface of the birefringent plate 115 and is outputted from the back surface of the birefringent plate 115. Thus, the birefringent plate 115 separates the s-polarized light and the p-polarized light that have passed through the liquid crystal layer 113 into the s-polarized transmitted light L2 and the p-polarized transmitted light L2 by a separation width (|d1−d2|). Here, in a case of d1=d2, the s-polarized transmitted light L2 and the p-polarized transmitted light L2 are outputted from a mutually same position of the back surface of the birefringent plate 115. Accordingly, in this case, the birefringent plate 115 combines the s-polarized light and the p-polarized light that have passed through the liquid crystal layer 113 to generate combined light.

(Case of V=V3 (FIG. 6C))

The workings with respect to the incident light L1 of the birefringent plate 111 are the same as described above. Hence, the workings of each of the liquid crystal layer 113 and the birefringent plate 115 are described below. The p-polarized light separated by the birefringent plate 111 enters the liquid crystal layer 113 of which polarization conversion efficiency is T3 (=50%), and thereafter, the p-polarized light is converted into circularly polarized light, and travels in straight lines in the liquid crystal layer 113 and is outputted from the back surface of the liquid crystal layer 113. The s-polarized light separated by the birefringent plate 111 enters the liquid crystal layer 113 of which polarization conversion efficiency is T3 (=50%), and thereafter, the s-polarized light is also converted into circularly polarized light, and travels in straight lines in the liquid crystal layer 113 and is outputted from the back surface of the liquid crystal layer 113. Accordingly, the liquid crystal layer 113 converts, into the circularly polarized light, the p-polarized light and the s-polarized light separated by the birefringent plate 111, while keeping the separation width constant.

The circularly polarized light outputted from the liquid crystal layer 113 enters the birefringent plate 115, and thereafter, the circularly polarized light is separated into p-polarized light and s-polarized light by the separation width d2 by birefringence of the birefringent plate 115. In a case where a polarized component oscillating perpendicular to the optical axis AX2 of the birefringent plate 115 is s-polarized light, the s-polarized light travels in straight lines in the birefringent plate 115 without being influenced by birefringence and is outputted from the back surface of the birefringent plate 115. The p-polarized light oscillates in a direction orthogonal to the oscillating direction of the s-polarized light. Hence, under an influence of birefringence, the p-polarized light obliquely travels in the birefringent plate 115 in a direction opposite to the separation direction of the image in the birefringent plate 111. Further, the p-polarized light is refracted at a position shifted by the separation width d2 of the back surface of the birefringent plate 115 and is outputted from the back surface of the birefringent plate 115. Thus, the birefringent plate 115 respectively separates the circularly polarized light into which the p-polarized light is converted by the liquid crystal layer 113 and the circularly polarized light into which the s-polarized light is converted by the liquid crystal layer 113, into the s-polarized transmitted light L2 and the p-polarized transmitted light L2 by the separation width d2.

Here, in a case of d1=d2, the p-polarized light that is separated from the circularly polarized light into which the p-polarized light is converted by the liquid crystal layer 113 and the s-polarized light that is separated from the circularly polarized light into which the s-polarized light is converted by the liquid crystal layer 113 are outputted from a mutually same position of the back surface of the birefringent plate 115. In this case, the transmitted light L2 that is circularly polarized light is outputted from the back surface of the birefringent plate 115. Accordingly, in this case, the birefringent plate 115 separates two beams of circularly polarized light outputted from the liquid crystal layer 113 into the p-polarized transmitted light L2 and the s-polarized transmitted light L2 by the separation width (d2+d2), and combines the once-separated p-polarized light and the once-separated s-polarized light at a position between the p-polarized transmitted light L2 and the s-polarized transmitted light L2 to generate combined light.

Next, description is given of a point image intensity distribution of transmitted light of the variable optical LPF 11. In a case where the voltage V2 is applied between the electrodes 112 and 114, the variable optical LPF 11 generates one peak p1 in the point image intensity distribution of the transmitted light of the variable optical LPF 11. The peak p1 is formed by one beam of transmitted light L2 outputted from the birefringent plate 115. In a case where the voltage V1 is applied between the electrodes 112 and 114, the variable optical LPF 11 generates two peaks p2 and p3 in the point image intensity distribution of the transmitted light of the variable optical LPF 11. The two peaks p2 and p3 are formed by two beams of transmitted light L2 outputted from the birefringent plate 115.

In a case where the voltage V3 is applied between the electrodes 112 and 114 and d1=d2 is established, the variable optical LPF 11 generates three peaks p1, p2, and p3 in the point image intensity distribution of the transmitted light of the variable optical LPF 11. The three peaks p1, p2, and p3 are formed by three beams of transmitted light L2 outputted from the birefringent plate 115. In a case where the voltage V3 is applied between the electrodes 112 and 114 and d1≠d2 is established, the variable optical LPF 11 generates four peaks p1, p2, p3, and p4 in the point image intensity distribution of the transmitted light of the variable optical LPF 11. The four peaks p1, p2, p3, and p4 are formed by four beams of transmitted light L2 outputted from the birefringent plate 115.

As described above, in a case where the voltage V3 is applied between the electrodes 112 and 114, the variable optical LPF 11 generates the three peaks p1 to p3 or the four peaks p1 to p4 in the point image intensity distribution of the transmitted light of the variable optical LPF 11. Here, in the variable optical LPF 11, in a case where a magnitude of the voltage V3 applied between the electrodes 112 and 114 is changed, values of the above-described three peaks p1 to p3 or values of the above-described four peaks p1 to p4 are changed. In other words, in the variable optical LPF 11, in a case where the magnitude of the voltage V3 applied between the electrodes 112 and 114 is changed, the point image intensity distribution of the transmitted light is changed.

In such a manner, the variable optical LPF 11 changes the magnitude of the voltage V applied between the electrodes 112 and 114 to change the point image intensity distribution of the transmitted light. Here, peak values (peak heights) of the above-described three peaks p1 to p3 and peak values (peak heights) of the above-described four peaks p1 to p4 are changed with the magnitude of the voltage V applied between the electrodes 112 and 114. In contrast, peak positions of the above-described three peaks p1 to p3 and peak positions of the above-described four peaks p1 to p4 are determined by the separation widths d1 and d2. The separation widths d1 and d2 are fixed irrespective of the magnitude of the voltage V3 applied between the electrodes 112 and 114. Accordingly, the peak positions of the above-described three peaks p1 to p3 and the peak positions of the above-described four peaks p1 to p4 are fixed irrespective of the magnitude of the voltage V3 applied between the electrodes 112 and 114.

Next, description is given of a relationship between the point image intensity distribution of the transmitted light and the cut-off frequency fc. FIG. 7 illustrates an example of an MTF (Modulation Transfer Function) in each of FIG. 6A. to FIG. 6C. A horizontal axis indicates a spatial frequency, and a vertical axis indicates standardized contrast. In FIG. 6B, the variable optical LPF 11 has no light beam separation effect; therefore, the MTF in FIG. 6B is coincident with an MTF of a lens (for example, the lens 13, or the like) provided in a preceding stage of the variable optical LPF 11. In FIG. 6A, a distance between peaks is larger than a distance between peaks in FIG. 6C, and the light beam separation effect is maximum. Accordingly, a cut-off frequency fc1 of the MTF in FIG. 6A is smaller than a cut-off frequency fc2 of the MTF in FIG. 6C.

In FIG. 6C, the separation width is equal to the separation width in FIG. 6A, but the number of peaks is larger than the number of peaks in FIG. 6A, and the distance between peaks is narrower than the distance between peaks in FIG. 6A. Accordingly, in FIG. 6C, the light beam separation effect is weaker than the light beam separation effect in FIG. 6A; therefore, the cut-off frequency fc2 of the MTF in FIG. 6C is larger than the cut-off frequency fc1 of the MTF in FIG. 6A. The cut-off frequency fc2 of the MTF in FIG. 6C is changed with the magnitude of the voltage V3 applied between the electrodes 112 and 114, and may be any frequency larger than the cut-off frequency fc1 of the MTF in FIG. 6A. Thus, the variable optical LPF 11 changes the magnitude of the voltage V applied between the electrodes 112 and 114 to set the cut-off frequency fc to any value equal to or larger than a cut-off frequency at which the light beam separation effect is maximum.

(Detailed Description of Image Processor 50 and Memory Unit 70)

Next, detailed description is given of the image processor 50 and the memory unit 70.

The memory unit 70 holds the image data 71, the saturation data 72, the evaluation data 73, and the set value 74, as described above.

The image data 71 includes a plurality of pieces of image data obtained by the imaging element 40, and includes, for example, image data $I_1$ to be described later, a plurality of pieces of image data $I_2$ to be described later, image data I to be described later, etc. The image data $I_1$ is image data without false color or image data with less false color. The image data without false color or the image data with less false color is obtained, for example, in a case where the effect of the variable optical LPF 11 is maximum or substantially maximum. In other words, the image data without false color or the image data with less false color is obtained, for example, in a case where the cut-off frequency fc of the variable optical LPF 11 is minimum or substantially minimum. The plurality of pieces of image data $I_2$ are image data obtained in a case where a set value different from a set value used to obtain the image data $I_1$ is set to the variable optical LPF 11. The image data I is image data obtained by the imaging element 40 in a state in which an appropriate set value (the set value 74) is set to the variable optical LPF 11.

The set value 74 is a set value of the variable optical LPF 11 suitable for a purpose of a user, and is a set value set to the variable optical LPF 11 to obtain the image data I. The set value 74 is obtained by execution of image processing in the image processor 50.

The saturation data 72 is data related to saturation obtained from the image data $I_1$. The saturation data 72 is, for example, two-dimensional data corresponding to each dot of a predetermined unit of the image data $I_1$. The evaluation data 73 is data for evaluation of resolution and false color.

The resolution is an indication representing finest distinguishable detail. "Resolution being high" indicates that a shot image has definition with which finer detail is distinguishable. "Resolution being low" indicates that the shot image does not have definition and has blurring. "Resolution being deteriorated" indicates that the shot image loses initial definition and has severer blurring than an initial shot image. In a case where the shot image having a high spatial frequency passes through a lowpass filter, a high-frequency component of the shot image is reduced to reduce (deteriorate) resolution of the shot image. In other words, deterioration in resolution corresponds to reduction in spatial frequency. Incidentally, false color is a phenomenon in which a color that is not an original color appears in an image. Respective colors are spatially sampled. Hence, in a case where the shot image includes a high-frequency component having a frequency exceeding the Nyquist frequency, this phenomenon occurs by aliasing (folding of the high-frequency component to a low frequency region). Accordingly, for example, the high-frequency component having a frequency exceeding the Nyquist frequency included in the shot image is reduced by the lowpass filter, thereby suppressing generation of false color in the shot image while reducing (deteriorating) resolution of the shot image.

The evaluation data 73 is derived on the basis of the image data $I_1$ and the plurality pieces of image data $I_2$. Specifically, the evaluation data 73 is derived on the basis of the image data $I_1$, the plurality of pieces of image data $I_2$, and the saturation data 33. The evaluation data 73 is derived with use of the following equation (1), for example.

$$D = f(I_1, I_2) + \Sigma C \cdot G(I_1, I_2) \tag{1}$$

Here, D is evaluation data about resolution and false color. $f(I_1, I_2)$ is a mathematical function that derives evaluation data (evaluation data D1) about change (deterioration) in resolution between two pieces of image data $I_1$ and $I_2$ obtained by the imaging element 40, and means that the resolution is reduced with an increase in a value of the evaluation data D1. The evaluation data D1 corresponds to a specific example of "first evaluation data" of the present disclosure. $f(I_1, I_2)$ is a mathematical function that derives the evaluation data D1 on the basis of spatial frequencies of two pieces of image data $I_1$ and $I_2$. $f(I_1, I_2)$ is a mathematical function that derives the evaluation data D1 on the basis of, for example, a difference between a frequency spectrum of the image data $I_1$ and a frequency spectrum of the image data $I_2$. $f(I_1, I_2)$ is a mathematical function that derives the evaluation data D1 on the basis of power extracted at a frequency at which the effect of the variable optical LPF 11 is maximum. The power is extracted from the difference between the frequency spectrum of the image data $I_1$ and the frequency spectrum of the image data $I_2$. The evaluation data D1 is derived from the first term on the right-hand side of the equation (1). C is the saturation data 72. $\Sigma C \cdot G(I_1, I_2)$ is a mathematical function that derives evaluation data (evaluation data D2) about change in false color between two pieces of image data $I_1$ and $I_2$ on the basis of gray-scale data of the two pieces of image data $I_1$ and $I_2$, and means that false color is generated in a wider range with an increase in the value of $\Sigma C \cdot G(I_1, I_2)$. The evaluation data D2 corresponds to a specific example of "second evaluation data" of the present disclosure. $\Sigma C \cdot G(I_1, I_2)$ is a mathematical function that derives the evaluation data D2 on the basis of, for example, a difference between the gray-scale data of the image data $I_1$ and the gray-scale data of the image data $I_2$. $\Sigma C \cdot G(I_1, I_2)$ is a mathematical function that derives the evaluation data D2 on the basis of, for example, the difference between the gray-scale data of the image data $I_1$ and the gray-scale data of the image data $I_2$, and C (the saturation data 72) obtained from the image data $I_1$. $\Sigma C \cdot G(I_1, I_2)$ is, for example, a mathematical function that derives, as the evaluation data D2, a total sum obtained by multiplying the difference between the gray-scale data of the image data $I_1$ and the gray-scale data of the image data $I_2$ by C. The evaluation data D2 in consideration of saturation of a subject is derived from the second term on the right-hand side of the equation (1).

FIG. 8 illustrates an example of the evaluation data D1 obtained from the first term on the right-hand side of the equation (1) and the evaluation data D2 obtained from the second term on the right-hand side of the equation (1) in graph. It is seen that in the evaluation data D1 obtained from the first term on the right-hand side of the equation (1), at the beginning, resolution is abruptly worsened with an increase in the effect of the variable optical LPF 11, and later on, change in resolution becomes gradually gentle. It is seen that in the evaluation data D2 obtained from the second term on the right-hand side of the equation (1), a range of false color is gradually reduced with an increase in the effect of the variable optical LPF 11.

(Image Processor 50)

FIG. 9 illustrates an example of functional blocks of the image processor 50. The image processor 50 performs predetermined processing on image data outputted from the imaging element 40. The image processor 50 sets the set value 74 of the effect (or the lowpass characteristics) of the variable optical LPF 11 on the basis of change in resolution and change in false color in a plurality of pieces of image data taken in accordance with changing of the effect (or the lowpass characteristics) of the variable optical LPF 11, for example. Examples of the lowpass characteristics include the cut-off frequency fc. The image processor 50 includes, for example, a preprocessing circuit 51, an image processing circuit 52, a display processing circuit 53, a compression decompression circuit 54, and a memory control circuit 55.

The preprocessing circuit 51 performs optical correction processing such as shading correction on the image data outputted from the imaging element 40. The image processing circuit 52 performs various kinds of processing to be described later on the corrected image data outputted from the preprocessing circuit 51. The image processing circuit 52 further outputs, for example, the image data obtained from the imaging element 40 to the display processing circuit 53. The image processing circuit 52 further outputs, for example, the image data obtained from the imaging element 40 to the compression decompression circuit 54. The image processing circuit 52 is described in detail later.

The display processing circuit 53 generates an image signal to be displayed on the display panel 60, from the image data received from the image processing circuit 52, and transmits the image signal to the display panel 60. The compression decompression circuit 54 performs, for example, compression encoding processing with a still-image encoding method such as JPEG (Joint Photographic Experts Group), on image data of a still image received from the image processing circuit 52. Moreover, the compression decompression circuit 54 performs, for example, compression encoding processing with a moving-image encoding method such as MPEG (Moving Picture Experts Group), on image data of a moving image received from the image processing circuit 52. The memory control circuit 55 controls data writing to and reading from the memory unit 70.

Next, description is given of an imaging procedure in the imaging apparatus 1.

FIG. 10 illustrates an example of the imaging procedure in the imaging apparatus 1. First, the controller 80 performs operation preparation (step S101). The operation preparation indicates preparation necessary for outputting of the image data I from the imaging element 40, and indicates, for example, setting a condition of AF (autofocus), and the like. Specifically, in a case where the controller 80 detects a preparation instruction from a user (such as pressing a shutter button halfway), the controller 80 instructs the lens driving unit 20 and the LPF driving unit 30 to perform operation preparation such as AF. By doing so, the lens driving unit 20 performs operation preparation on the lens 12 before outputting of the image data $I_1$ in accordance with such an instruction from the controller 80. The lens driving unit 20 sets, for example, a focus condition, etc. of the lens 12 to a predetermined value. At this time, the controller 80 causes the lens driving unit 20 to execute operation preparation such as AF while causing the variable optical LPF 11 not to optically operate. The LPF driving unit 30 performs operation preparation on the variable optical LPF 11 before outputting of the image data $I_1$ in accordance with such an instruction from the controller 80. The LPF driving unit 30 applies, for example, the voltage V2 between the electrodes 112 and 114. At this time, the polarization conversion efficiency T of the variable optical LPF 11 is T1.

Next, the controller 80 generates a change instruction for changing the effect of the variable optical LPF 11 by a pitch larger than a set minimum resolving power of the effect of the variable optical LPF 11, and gives the change instruction to the LPF driving unit 30. In other words, the controller 80 generates a change instruction for changing the cut-off frequency fc of the variable optical LPF 11 by a pitch larger than a set minimum resolving power of the cut-off frequency fc of the variable optical LPF 11, and gives the change instruction to the LPF driving unit 30. By doing so, the LPF driving unit 30 changes, for example, the voltage V (the constant frequency) applied between the electrodes of the variable optical LPF 11 by a pitch larger than the set minimum resolving power to gradually change the cut-off frequency fc of the variable optical LPF 11. At this time, the controller 80 generates an imaging instruction in synchronization with changing of the effect (the cut-off frequency fc) of the variable optical LPF 11, and gives the imaging instruction to the imaging element 40. By doing so, the imaging element 40 performs imaging in synchronization with changing of the effect of the variable optical LPF 11 (changing of the cut-off frequency fc) in accordance with such an instruction from the controller 80. As a result, the imaging element 40 generates a plurality of pieces of imaging data with mutually different effects (the cut-off frequencies fc) of the variable optical LPF 11, and outputs the plurality of pieces of imaging data to the image processor 50.

In the following, description is given of a specific method of obtaining the plurality of pieces of imaging data.

First, the controller 80 instructs the LPF driving unit 30 to make the effect of the variable optical LPF 11 maximum or substantially maximum within a range in which the effect of the variable optical LPF 11 is changeable (step S102). In other words, the controller 80 instructs the LPF driving unit 30 to make the cut-off frequency fc of the variable optical LPF 11 minimum or substantially minimum within a range in which the cut-off frequency fc is changeable. By doing so, the LPF driving unit 30 makes the effect of the variable optical LPF 11 maximum or substantially maximum within the range in which the effect of the variable optical LPF 11 is changeable in accordance with such an instruction from the controller 80. In other words, the LPF driving unit 30 makes the cut-off frequency fc of the variable optical LPF 11 minimum or substantially minimum within the range in which the cut-off frequency fc of the variable optical LPF 11 is changeable. The LPF driving unit 30 applies, for example, the voltage V1 or a voltage having a slightly larger value than the voltage V1 between the electrodes 112 and 114. As a result, the polarization conversion efficiency T of the variable optical LPF 11 becomes T2 (maximum) or a value close to T2.

Next, the controller 80 instructs the imaging element 40 to obtain the image data $I_1$ (step S103). Specifically, the controller 80 instructs the imaging element 40 to obtain the imaging data $I_1$ while the effect of the variable optical LPF 11 is maximum or substantially maximum within the range in which the effect of the variable optical LPF 11 is changeable. In other words, the controller 80 instructs the imaging element 40 to obtain the image data $I_1$ while the cut-off frequency fc of the variable optical LPF 11 is minimum or substantially minimum within the range in which the cut-off frequency fc of the variable optical LPF 11 is changeable. By doing so, the imaging element 40 obtains the color image data $I_1$ through discretely sampling, on the light reception surface 40A, light incident via the variable optical LPF 11 of which the effect is maximum or substantially maximum. In other words, the imaging element 40 obtains the color image data $I_1$ through discretely sampling, on the light reception surface 40A, light incident via the variable optical LPF 11 of which the cut-off frequency fc is minimum or substantially minimum. For example, the imaging element 40 obtains the color image data $I_1$ through discretely sampling, on the light reception surface 40A, light incident via the variable optical LPF 11 of which the polarization conversion efficiency T is maximum or substantially maximum.

The image data $I_1$ is image data generated by the imaging element 40 through driving the imaging element 40 in a case where the effect of the variable optical LPF 11 is maximum or substantially maximum within the range in which the effect of the variable optical LPF 11 is changeable. In other words, the image data $I_1$ is image data generated by the imaging element 40 through driving the imaging element 40 in a case where the cut-off frequency fc of the variable optical LPF 11 is minimum or substantially minimum within the range in which the cut-off frequency fc of the variable optical LPF 11 is changeable. The image data $I_1$ corresponds to a specific example of "first image data" of the present disclosure. The imaging element 40 outputs the obtained image data $I_1$ to the image processor 50. Next, the image processor 50 analyzes the obtained image data $I_1$ to derive data (the saturation data 33) related to saturation in the image data $I_1$ (step S104).

Next, the controller 80 instructs the LPF driving unit 30 to change the effect of the variable optical LPF 11 (step S105). Specifically, the controller 80 instructs the variable optical LPF 11 to cause the effect of the variable optical LPF 11 to become smaller than the previous effect of the variable optical LPF 11. In other words, the controller 80 instructs the LPF driving unit 30 to cause the cut-off frequency fc of the variable optical LPF 11 to become larger than the previous cut-off frequency fc. By doing so, the LPF driving unit 30 causes the effect of the variable optical LPF 11 to become smaller than the previous effect of the variable optical LPF 11 in accordance with such an instruction from the controller 80. In other words, the LPF driving unit 30 causes the cut-off frequency fc of the variable optical LPF 11 to become larger than the previous cut-off frequency fc of the variable optical LPF 11. The LPF driving unit 30 applies, for example, a voltage larger than the previous voltage as the voltage V3 between the electrodes 112 and 114. As a result, the polarization conversion efficiency T of the variable optical LPF 11 has a magnitude between T2 and T1 and a value smaller than the previous value.

Next, the controller 80 instructs the imaging element 40 to obtain the image data $I_2$ (step S106). The image data $I_2$ corresponds to a specific example of "second image data" of the present disclosure. Specifically, the controller 80 instructs the imaging element 40 to obtain the image data $I_2$ in a case where a set value different from the set value used to obtain the image data $I_1$ is set to the variable optical LPF 11. By doing so, the imaging element 40 obtains the color image data $I_2$ through spatially sampling, on the light reception surface 40A, light incident via the variable optical LPF 11 of which the effect is smaller than the previous effect of the variable optical LPF 11. In other words, the imaging element 40 obtains the color image data $I_2$ through spatially sampling, on the light reception surface 40A, light incident via the variable optical LPF 11 of which the cut-off frequency fc is larger than the previous cut-frequency fc of the variable optical LPF 11. For example, the imaging element 40 obtains the color image data $I_2$ through spatially sampling, on the light reception surface 40A, light incident via the variable optical LPF 11 of which the polarization conversion efficiency T has a magnitude between T2 and T1. The imaging element 40 outputs the obtained image data $I_2$ to the image processor 50.

Next, the controller 80 instructs the image processor 50 to derive appropriate lowpass characteristics (the set value 74). By doing so, the image processor 50 derives the appropriate lowpass characteristics (the set value 74) on the basis of change in resolution and change in false color in a plurality of pieces of image data (the image data $I_1$ and the image data $I_2$) obtained by the imaging element 40.

First, the image processor 50 derives two pieces of evaluation data D1 and D2 on the basis of the plurality of pieces of image data (the image data $I_1$ and the image data $I_2$) (step S107).

The image processor 50 derives the evaluation data D1 about change in resolution on the basis of the plurality of pieces of image data (the image data $I_1$ and the image data $I_2$). The image processor 50 derives the evaluation data D1 on the basis of, for example, a difference between the frequency spectrum of the image data $I_1$ and the frequency spectrum of the image data $I_2$. The image processor 50 derives the evaluation data D1, for example, through applying the image data $I_1$ and the image data $I_2$ to the first term on the right-hand side of the equation (1).

The image processor 50 derives the evaluation data D2 about change in false color on the basis of gray-scale data of the plurality of pieces of image data (the image data $I_1$ and the image data $I_2$). The image processor 50 derives the evaluation data D2 on the basis of, for example, a difference between the gray-scale data of the image data and the gray-scale data of the image data $I_2$. The image processor 50 derives the evaluation data D2 on the basis of, for example, the difference between gray-scale data of the image data $I_1$ and the gray-scale data of the image data $I_2$, and the saturation data 33 obtained from the image data $I_1$. The image processor 50 derives the evaluation data D2, for example, through applying the image data $I_1$, the image data $I_2$, and the saturation data 33 to the second term on the right-hand side of the equation (1).

Next, the image processor 50 determines appropriateness of the effect of the variable optical LPF 11 on the basis of two pieces of the evaluation data D1 and D2 obtained (step S108). In other words, the image processor 50 determines whether or not the two pieces of the evaluation data D1 and D2 obtained satisfy a desired standard corresponding to a purpose. The "desired standard corresponding to the purpose" depends on a shooting mode, a subject, a scene, etc. For example, the image processor 50 determines whether or not a total value (the evaluation data D) of the two pieces of evaluation data D1 and D2 newly obtained this time is a minimum value in a region where the effect (the cut-off frequency fc) of the variable optical LPF 11 is controllable.

In a case where the image processor 50 determines that the effect of the variable optical LPF 11 is appropriate, the image processor 50 adopts the lowpass characteristics of the variable optical LPF 11 at this time as the set value 74. Specifically, in the case where the image processor 50 determines that the effect of the variable optical LPF 11 is appropriate, the image processor 50 adopts the set value of the variable optical LPF 11 at this time as the set value 74. The image processor 50 stores the set value 74 in the memory unit 70. For example, in the case where the image processor 50 determines that the total value (the evaluation data D) of the two pieces of the evaluation data D1 and D2 newly obtained this time is the minimum value in the region where the effect of the variable optical LPF 11 is controllable, the image processor 50 adopts the set value of the variable optical LPF 11 at this time as the set value 74.

In a case where the image processor 50 determines that the effect of the variable optical LPF 11 is not appropriate, the image processor 50 returns to the step S105, and changes the effect (the cut-off frequency fc) of the variable optical LPF 11, and sequentially executes the step S106 and subsequent steps. Thus, the image processor 50 repeatedly executes the steps S105 to S108 to derive the set value 74 of the variable optical LPF 11 on the basis of two pieces of derived evaluation data D1 and D2. In other words, the image processor 50 derives the set value 74 of the variable optical LPF 11 on the basis of the plurality of pieces of image data (the image data and the plurality of pieces of image data $I_2$) shot while changing lowpass characteristics (cut-off frequencies) in accordance with the preparation instruction from the user (for example, pressing the shutter button halfway). The image processor 50 provides, to the controller 80, a notification that the set value 74 is obtained.

In a case where the controller 80 detects the imaging instruction from the user (for example, pressing the shutter button) after the controller 80 receives, from the image processor 50, the notification that the set value 74 is obtained, the controller 80 instructs the LPF driving unit 30 to set the variable optical LPF 11 to the set value 74. Specifically, in a case where the controller 80 detects the imaging instruction from the user (for example, pressing the shutter button), the controller 80 reads the set value 74 from the memory unit 70, and outputs the read set value 74 to the LPF driving unit 30, and instructs the LPF driving unit 30 to set the variable optical LPF 11 to the set value 74. By doing so, LPF driving unit 30 sets the variable optical LPF 11 to the set value 74 in accordance with the instruction from the controller 80.

The controller 80 further instructs the imaging element 40 to obtain the image data I. By doing so, the imaging element 40 obtains the image data I in accordance with such an instruction from the controller 80 (step S109). In other words, the imaging element 40 obtains the color image data I through discretely sampling, on the light reception surface 40A, light incident via the variable optical LPF 11 that has been set to the set value 74. The imaging element 40 outputs the obtained image data I to the image processor 50. The image processor 50 performs predetermined processing on the image data I, and thereafter outputs the image data I having that has been subjected to the processing to the memory unit 70 and the display panel 60. By doing so, memory unit 70 holds the image data I inputted from the image processor 50, and the display unit 60 displays the image data I inputted from the image processor 50 (step S110).

It is to be noted that in the imaging apparatus 1, the above-described operation preparation may be performed by a manual operation by the user. Moreover, in the imaging apparatus 1, in a case where, a focus condition, etc. of the lens 13 is changed in the middle of consecutively obtaining the image data $I_2$ while changing the effect of the variable optical LPF 11, steps may be executed again from the step of obtaining the image data $I_1$. The above-described instruction from the user may be performed by a method other than "pressing the shutter button halfway". For example, the above-described instruction from the user may be performed through pressing a button (an operation button other than the shutter button) attached to a main body of the imaging apparatus 1 after setting the focus condition, etc. of the lens 13. Moreover, the above-described instruction from the user may be performed through turning an operation dial attached to the main body of the imaging apparatus 1 after setting the focus condition, etc. of the lens 13.

Incidentally, as described above, the "desired standard corresponding to the purpose" depends on the shooting mode, the subject, the scene, etc. Examples of the "desired standard corresponding to the purpose" is therefore described below.

(Case where it is Desired to Reduce Deterioration in Resolution without a Large Increase in False Color)

For example, as illustrated in FIG. 8, in a case where a range (a range a) in which change in the evaluation data D2 with respect to the effect of the variable optical LPF 11 is relatively gentle is present, the controller 80 may set, as the set value 74, the effect of the variable optical LPF 11 in a case where the evaluation data D2 is smallest within the range a (indicated by a white circle in FIG. 8). In other words, in a case where a range (the range a) in which change in the evaluation data D2 with respect to the cut-off frequency fc of the variable optical LPF 11 is relatively gentle is present, the controller 80 may set, as the set value 74, the cut-off frequency fc of the variable optical LPF 11 in the case where the evaluation data D2 is smallest within the range a (indicated by the white circuit in FIG. 8). In such a case, it is possible to reduce deterioration in resolution without a large increase in false color.

(Case where it is Desired to Increase Processing Speed)

In the foregoing embodiment, the second term (the evaluation data D2) on the right-hand side of the equation (1) may serve as, for example, a stepwise profile depending on characteristics of the subject and the lens 13, as illustrated in FIG. 11. It is to be noted that FIG. 11 illustrates an example of the evaluation data D1 and D2. In this case, for example, the controller 80 instructs the LPF driving unit 30 to divide the region where the effect (the cut-off frequency fc) of the variable optical LPF 11 is controllable into a plurality of regions R and sequentially change the effect of the variable optical LPF 11 to a value set for each of the divided regions R, as illustrated in FIG. 11. In this case, the LPF driving unit 30 sequentially sets the effect (the cut-off frequency fc) of the variable optical LPF 11 to the value set for each of the regions R in accordance with such an instruction from the controller 80. Here, each of the regions R has a width larger than the set minimum resolving power of the effect (the cut-off frequency fc) of the variable optical LPF 11. Thus, the LPF driving unit 30 sequentially changes the effect (the cut-off frequency fc) of the variable optical LPF 11 by a pitch larger than the set minimum resolving power of the effect (the cut-off frequency fc) of the variable optical LPF 11.

The controller 80 instructs the imaging element 40 to perform imaging in synchronization with setting of the effect (the cut-off frequency fc) of the variable optical LPF 11. By doing so, the imaging element 40 obtains the image data $I_1$ and the plurality of pieces of image data $I_2$, and outputs the image data $I_1$ and the plurality of pieces of image data $I_2$ that are thus obtained to the image processor 50. The image processor 50 derives two pieces of evaluation data D1 and D2 on the basis of the image data $I_1$ and the plurality of pieces of image data $I_2$ that are thus inputted.

The image processor 50 may set the set value of the variable optical LPF 11 to a value at which false color starts increasing (for example, k in FIG. 11) in a region R (for example, a region R1) where a total value (the evaluation data D) of the two pieces of evaluation data D1 and D2 is minimum. In such a case, it is possible to reduce the number of times the effect (the cut-off frequency fc) of the variable optical LPF 11 is actually changed, as compared with the foregoing embodiment. As a result, processing speed is increased.

(Case where a Person Whose Face is Detected has Hair)

In a case where a subject to be shot has hair, false color may be generated in the hair in some cases. The false color generated in the subject is conspicuous; therefore, it is preferable to minimize such false color. In this case, the image processor 50 may set the set value 74 on the basis of change in false color in a face region included in a plurality of pieces of image data (the image data $I_1$ and the image data $I_2$).

FIG. 12 illustrates an example of an imaging procedure in a case where a person whose face is detected has hair. The image processor 50 may execute face detection on the image data $I_1$ upon obtaining the image data $I_1$ from the imaging element 40 (step S111 in FIG. 12). Moreover, in a case where the face is detected as a result of execution of the face detection on the image data $I_1$ in the step S111, the image processor 50 may detect whether or not the person whose face is detected has hair (step S112 in FIG. 12).

As a result, in a case where the person whose face is detected has hair, the image processor 50 may perform, for example, threshold processing on the evaluation data D2. For example, the image processor 50 may determine, as the set value 74, a set value that makes the effect of the variable optical LPF 11 weakest within a range in which the evaluation data D2 is lower than a predetermined threshold value Th1 (FIG. 13). It is to be noted that FIG. 13 illustrates an example of the evaluation data D1 and D2 together with various threshold values. At this time, the predetermined threshold value Th1 is a threshold value for face detection, and is, for example, a value suitable to remove false color generated in hair of a human that is the subject. The image processor 50 may perform threshold processing not only on the evaluation data D2 but also on the evaluation data D1, for example. The controller 80 may determine, as the set value 74, a set value that makes the effect of the variable optical LPF 11 weakest within a range in which the evaluation data D2 is lower than the predetermined threshold value Th1 and a range in which the evaluation data D1 is lower than a predetermined threshold value Th2 (FIG. 13).

In a case where the person whose face is detected does not have hair, the image processor 50 may determine the set value 74 by a method similar to the above-described method. In the case where the person whose face is detected has hair, the image processor 50 may determine the set value 74 in this manner.

(Case of Macro Shooting Mode)

FIG. 14 illustrates an example of an imaging procedure in a macro shooting mode. In a case where the shooting mode is the macro shooting mode, the user is often intended to shoot an object in close proximity to the object. At this time, specifically in a case where the user is intended to shoot a product, generation of false color in the product to be shot is often unacceptable. In such a case, it is preferable that the user himself actually confirm the presence or absence of false color, and then determine the set value 74. Specifically, the image processor 50 preferably sets, as the set value 74, the effect (the cut-off frequency fc) of the variable optical LPF 11 in taking one piece of image data $I_2$ selected by the user from the plurality of pieces of image data $I_2$.

In a case where the imaging element 40 is in the macro shooting mode, after the step S101 is completed, the image processor 50 performs the following processing upon detection of an imaging instruction from the user (for example, pressing the shutter button). The image processor 50 sequentially executes the steps S102 to S107, and thereafter, the image processor 50 determines, for example, whether or not the evaluation data D2 is smaller than a predetermined threshold value Th3 in step S108. At this time, the predetermined threshold value Th3 is a threshold value for the macro shooting mode, and is, for example, a value suitable to remove false color generated in an object that is a subject in the macro shooting mode.

As a result, in a case where the evaluation data D2 is smaller than the predetermined threshold value Th3 (FIG. 13), the image processor 50 obtains, as an appropriate value candidate 35a, the set value of the variable optical LPF 11 corresponding to the evaluation data D2 at this time (step S113 in FIG. 14), and further stores the image data $I_2$ corresponding to the appropriate value candidate 35a together with the appropriate value candidate 35a in the memory unit 70. In a case where evaluation data related to change in false color is not lower than the predetermined threshold value Th1, the image processor 50 returns to the step S105.

It is to be noted that the image processor 50 may perform threshold processing, for example, not only on the evaluation data D2 but also on the evaluation data D1. For example, the image processor 50 may determine whether or not the evaluation data D2 is lower than the predetermined threshold value Th3 and whether or not the evaluation data D1 is lower than a predetermined threshold value Th4 (FIG. 13). As a result, in a case where the evaluation data D2 is lower than the predetermined threshold value Th3 and the evaluation data D1 is lower than the predetermined threshold value Th4, the image processor 50 may obtain the set value of the variable optical LPF 11 corresponding to the evaluation data D2 as the appropriate value candidate 35a. Moreover, in a case where the evaluation data D2 is not lower than the predetermined threshold value Th3 or in a case where the evaluation data D1 is not lower than the threshold value Th4, the image processor 50 may return to the step S105.

After the step S113 is performed, the image processor 50 determines whether or not the changing of the effect of the variable optical LPF 11 is completed (step S114 in FIG. 14). The image processor 50 repeatedly executes the steps S105 to S108 and S113 until the changing of the effect of the variable optical LPF 11 is completed. In other words, every time evaluation data related to change in false color is lower than the predetermined threshold value Th3, the image processor 50 obtains a value corresponding to the evaluation data D2 at this time as the appropriate value candidate 35a. As a result, after the changing of the effect of the variable optical LPF 11 is completed, the image processor 50 requests the user to select one piece of image data $I_2$ from the plurality of pieces of image data $I_2$ corresponding to respective appropriate value candidates 35a.

Specifically, the image processor 50 outputs, to the display unit 60, one piece of image data $I_2$ selected from the plurality of pieces of image data $I_2$ corresponding to the respective appropriate value candidates 35a. By doing so, the display unit 60 displays the image data $I_2$ inputted from the image processor 50 (step S115 in FIG. 14). The image processor 50 sequentially outputs the plurality of pieces of image data $I_2$ corresponding to the respective appropriate value candidates 35a to the display unit 60. The image processor 50 outputs the plurality of pieces of image data $I_2$ to the display unit 60 in accordance with the display instruction from the user (for example, pressing an operation button attached to the main body of the imaging apparatus 1, turning an operation dial attached to the main body of the imaging apparatus 1, or the like) so as to change from the image data $I_2$ displayed on the display unit 60 to another image data $I_2$. The display unit 60 changes the image data $I_2$ to be displayed every time the image data $I_2$ is inputted from the image processor 50.

At this time, the image processor 50 may output, to the display unit 60, for example, a numerical value (for example, an area of a false color generation region in terms of pixel) and a histogram together with the image data $I_2$. By doing so, the display unit 60 displays the numerical value and the histogram inputted from the image processor 50. The histogram may be, for example, a representation of each region with a shade corresponding to the number of pixels in which false color is generated, where a vertical axis and a horizontal axis indicate saturation (for example, Cb and Cr on YCbCr space), as illustrated in FIG. 15. It is to be noted that FIG. 15 illustrates an example of the histogram.

In a case where a selection instruction from the user (for example, pressing another operation button attached to the main body of the imaging apparatus 1, or the like) is detected, the image processor 50 determines, as the set value 74, the appropriate value candidate 35a corresponding to the image data $I_2$ displayed on the display unit 60 upon such detection. Thus, the image processor 50 causes the user to select appropriate image data $I_2$ (that is, an appropriate value as the variable optical LPF 11) (step S116 in FIG. 14).

It is to be noted that in a case where the shooting mode is the macro shooting mode, the image processor 50 may determine, as the set value 74, a set value that makes the effect of the variable optical LPF 11 weakest (a set value that makes the cut-off frequency fc largest) within the range in which the evaluation data D2 is lower than the predetermined threshold value Th3. The image processor 50 may perform the threshold processing, for example, not only on the evaluation data D2 but also on the evaluation data D1. The image processor 50 may determine, as the set value 74, a set value that makes the effect of the variable optical LPF 11 weakest (a set value that makes the cut-off frequency fc largest) within the range in which the evaluation data D1 is lower than the predetermined threshold value Th3 and within the range in which the evaluation data D1 is lower than the predetermined threshold value Th4.

(Case where Processing Corresponding to a False Color Generation Position is Necessary)

In a case where a mode used to perform processing corresponding to a false color generation position (which is referred to as "false color processing mode" for the sake of convenience) is present as a shooting mode, in the false color processing mode, the image processor 50 may execute detection of the false color generation position after the step S101 is performed. It is considered that in a case where false color is generated in a very large region of an entire screen or in a case where false color is generated at a center of the screen, if the false color remains, there is a possibility that the remaining false color is conspicuous. Moreover, it is considered that in a case where false color is present at four corners of the screen, completely eliminating the false color may unnecessarily cause deterioration in resolution. In such a case, the image processor 50 preferably adjusts the effect of the variable optical LPF 11 in accordance with the false color generation position. Specifically, the image processor 50 preferably sets the set value 74 on the basis of change in resolution and change in false color in a plurality of pieces of image data $I_1$ and $I_3$, and a position of false color included in the plurality of pieces of image data $I_1$ and $I_3$.

FIG. 16 illustrates an example of an imaging procedure in the false color processing mode. First, the image processor 50 executes detection of the false color generation position after executing the steps S101 to S104. Specifically, first, the controller 80 makes the effect of the variable optical LPF 11 minimum or substantially minimum (step S117). For example, the controller 80 instructs the LPF driving unit 30 to make the effect of the variable optical LPF 11 minimum or substantially minimum (to make the cut-off frequency fc maximum or substantially maximum). By doing so, the LPF driving unit 30 makes the effect of the variable optical LPF 11 minimum or substantially minimum in accordance with such an instruction from the controller 80. In other words, the LPF driving unit 30 makes the cut-off frequency fc maximum or substantially maximum in accordance with the instruction from the controller 80. The LPF driving unit 30 applies, for example, the voltage V2 or a voltage slightly smaller than the voltage V2 between the electrodes 112 and 114. As a result, the polarization conversion efficiency T of the variable optical LPF 11 becomes T1 (minimum) or substantially T1.

Next, the image processor 50 obtains the image data $I_3$ in a case where the effect of the variable optical LPF 11 is minimum or substantially minimum (step S118). Specifically, the controller 80 instructs the imaging element 40 to perform imaging in the case where the effect of the variable optical LPF 11 is minimum or substantially minimum. In other words, the controller 80 instructs the imaging element 40 to perform imaging in a case where the cut-off frequency fc is maximum or substantially maximum. By doing so, the imaging element 40 obtains the color image data $I_3$ through discretely sampling, on the light reception surface 40A, light incident via the variable optical LPF 11 of which the effect is minimum or substantially minimum. In other words, the imaging element 40 obtains the color image data $I_3$ through discretely sampling, on the light reception surface 40A, light incident via the variable optical LPF 11 of which the cut-off frequency fc is maximum or substantially maximum. For example, the imaging element 40 obtains the color image data $I_3$ through discretely sampling, on the light reception surface 40A, light incident via the variable optical LPF 11 of which the polarization conversion efficiency T is minimum or substantially minimum. At this time, there is a high possibility that remaining false color that is not removed by the variable optical LPF 11 is present in the image data $I_3$. The imaging element 40 outputs the obtained image data $I_3$ to the image processor 50. As a result, the image processor 50 obtains the image data $I_3$.

Next, the image processor 50 detects a position of the false color included in the image data $I_3$ (step S119). Specifically, the image processor 50 detects the position of the false color included in the image data $I_3$ with use of the image data $I_1$, the image data $I_3$, and the saturation data 33. The image processor 50 calculates, for example, a difference between gray scales of two pieces of image data $I_1$ and $I_3$ per dot, and multiplies a thus-obtained difference image by C to generate a false color determination image. Next, the image processor 50 determines whether or not a value of each of dots of the false color determination image exceeds a predetermined threshold value Th5. As a result, in a case where any of values of the respective dots of the false color determination image exceeds the predetermined threshold value Th5, the image processor 50 obtains coordinates of the dot exceeding the predetermined threshold value Th5, and stores the obtained coordinates as a false color generation position (the false color generation position 35) included in the image data $I_3$ in the memory unit 70 (FIG. 17). It is to be noted that FIG. 17 illustrates an example of data stored in the memory unit 70. The image processor 50 may use the image data $I_2$ in place of the image data $I_3$. Specifically, the image processor 50 may detect a position of false color in the image data $I_2$. The image processor 50 may detect the position of false color in the image data $I_2$ and $I_3$.

Next, the image processor 50 determines whether or not the evaluation data D2 obtained in the step S108 in execution of the steps S105 to S108 satisfies a desired standard corresponding to the false color generation position (the false color generation position 35).

In a case where the false color generation position 35 is present at the center of the screen or in a large region including the center of the screen, the image processor 50 may multiply, for example, the evaluation data D2 by a correction factor α used in the case where the false color generation position 35 is present at the center of the screen (FIG. 18). In a case where the false color generation position 35 is present at four corners of the screen, the image processor 50 may multiply, for example, the evaluation data D2 by a correction factor β used in the case where the false color generation position 35 is present at the four corners of the screen (FIG. 18). The correction factor β has, for example, a value smaller than the correction factor α. It is to be noted that FIG. 18 illustrates an example of false color generation positions to which the correction factors α and β are applied. In FIG. 18, the correction factors α and β are illustrated corresponding to the false color generation positions.

It is to be noted that in the case where the false color generation position 35 is present at the center of the screen or in the large region including the center of the screen, the image processor 50 may determine, for example, whether or not the evaluation data D2 is equal to or lower than a threshold value Th6 used in the case where the false color generation position 35 is present at the center of the screen (FIG. 19). In the case where the false color generation position 35 is present at four corners of the screen, the evaluation data D2 may determine, for example, whether or not the evaluation data D2 is equal to or lower than a threshold value Th7 used in the case where the false color generation position 35 is present at the four corners of the screen (FIG. 19). For example, the threshold value Th6 is smaller than the threshold value Th7. It is to be noted that FIG. 19 illustrates an example of false color generation positions to which the threshold values Th6 and Th7 are applied. In FIG. 19, the threshold values Th6 and Th7 are illustrated corresponding to the false color generation positions.

In a case where the evaluation data D2 satisfies the desired standard corresponding to the false color generation position 35, the image processor 50 adopts a value corresponding to the evaluation data D2 at this time as the set value 74, and stores the value in the memory unit 70.

It is to be noted that in place of the position of false color, the image processor 50 may detect a position where deterioration in resolution occurs together with false color in the image data $I_3$. At this time, the image processor 50 may use the image data $I_2$ in place of the image data $I_3$. Specifically, in place of the position of false color, the image processor 50 may detect a position where deterioration in resolution occurs together with false color in the image data $I_2$. In place of the position of the false color, the image processor 50 may detect the position where deterioration in resolution occurs together with false color in the image data $I_2$ and $I_3$. In the step S108, the image processor 50 determines whether or not the evaluation data D1 satisfies a desired standard corresponding to a resolution deterioration occurrence position (a resolution deterioration position).

In a case where the resolution deterioration position is present at the center of the screen or in a large region including the center of the screen, the image processor 50 may multiply, for example, the evaluation data D1 by a correction factor γ used in the case where the resolution deterioration position is present at the center of the screen. In a case where the resolution deterioration position is present at four corners of the screen, the image processor 50 may multiply, for example, the evaluation data D1 by a correction factor δ used in the case where the resolution deterioration position is present at the four corners of the screen. The correction factor δ has, for example, a value smaller than the correction factor γ.

It is to be noted that in the case where the resolution deterioration position is present at the center of the screen or in the large region including the center of the screen, the image processor 50 may determine, for example, whether or not the evaluation data D1 is equal to or lower than a threshold value Th8 used in the case where the resolution deterioration position is present at the center of the screen. In the case where the resolution deterioration position is present at the four corners of the screen, the image processor 50 may determine, for example, whether or not the evaluation data D1 is equal to or lower than a threshold value Th9 used in the case where the resolution deterioration position is present at the four corners of the screen. For example, the threshold value Th8 is smaller than the threshold value Th9.

In a case where the evaluation data D1 satisfies the desired standard corresponding to the resolution deterioration position, the controller 80 adopts a value corresponding to the evaluation data D1 at this time as the set value 74, and stores the value in the memory unit 70.

Effects

Next, description is given of effects of the imaging apparatus 1.

In a case where a typical single-plate digital camera uses a Bayer coding imager, it is necessary to restore lost information through performing demosaicing processing on image data obtained by the imager. However, it is difficult to fully derive the lost information in principle, which unavoidably causes a decline in resolution and occurrence of artifacts.

It is therefore considered to provide a lowpass filter between a lens and the imager. In such a case, adjusting an effect of the lowpass filter makes it possible to reduce false color that is one of the artifacts. However, resolution is further reduced in exchange for reduction in false color. The effect of the lowpass filter is adjustable to prevent excessive reduction in resolution; however, in such a case, the effect of reducing false color is decreased. As described above, in the lowpass filter, an increase in resolution and reduction in false color have a trade-off relationship therebetween. Therefore, in a case where the lowpass filter is set in consideration of one of resolution and false color, there is an issue that an image on which the effect of the lowpass filter is strongly exerted is selected, thereby deteriorating resolution more than necessary.

In contrast, in the present embodiment, the evaluation data D1 and the evaluation data D2 are derived on the basis of a plurality of pieces of image data (the image data $I_1$ and the plurality of pieces of image data $I_2$) obtained while changing the effect of the variable optical LPF 11. Moreover, the set value 74 of the variable optical LPF 11 is derived on the basis of the derived evaluation data D1 and the derived evaluation data D2. This makes it possible to obtain the image data I having well-balanced image quality corresponding to the purpose of the user.

Further, in the present embodiment, in the case where the evaluation data D1 is generated on the basis of a difference between frequency spectra of two pieces of image data $I_1$ and $I_2$ and the evaluation data D2 is generated on the basis of a difference between gray scales of the two pieces of image data $I_1$ and $I_2$, it is possible to more accurately obtain the image data having well-balanced image quality.

Furthermore, in the present embodiment, in the case where a value at which a total value (the evaluation data D) of the evaluation data D1 and the evaluation data D2 is smallest is adopted as the set value 74, it is possible to obtain the image data having well-balanced image quality by a simple method.

Moreover, in the present embodiment, for example, as illustrated in FIG. 8, in the case where the range a in which change in the evaluation data D2 with respect to the effect (the cut-off frequency fc) of the variable optical LPF 11 is relatively gentle is present, adopting, as the set value 74, a value at which the effect (the cut-off frequency fc) of the variable optical LPF 11 is lowest within the range a makes it possible to reduce resolution without large change in false color by a simple method.

Further, in the present embodiment, for example, as illustrated in FIG. 11, in the case where the region where the effect (the cut-off frequency fc) of the variable optical LPF 11 is controllable is divided into a plurality of regions R and the evaluation data D1 and the evaluation data D2 in each of the divided regions R are derived, it is possible to reduce the number of times the effect of the variable optical LPF 11 is actually changed, as compared with the foregoing embodiment. As a result, it is possible to obtain the image data I having well-balanced image quality while increasing processing speed.

In the present embodiment, in the case where face detection is performed on the image data $I_1$ and detection whether or not a person whose face is detected has hair is performed, a value that makes the effect of the variable optical LPF 11 weakest within the range in which the evaluation data D2 is lower than the threshold value Th1 for face detection is set as the set value 74 of the variable optical LPF 11. This makes it possible to obtain the image data I having less false color in the hair of the subject. Moreover, in the case where a value that makes the effect of the variable optical LPF 11 weakest within the range in which the evaluation data D1 is lower than the predetermined threshold value Th2 is set as the set value 74 of the variable optical LPF 11, it is possible to obtain the image data having well-balanced image quality.

In the present embodiment, in the case where the shooting mode is the macro shooting mode, every time the evaluation data D2 is lower than the threshold value Th3 for the macro shooting mode, a value corresponding to the evaluation data D2 at this time becomes the appropriate value candidate 35a, which makes it possible for the user to select one piece of image data $I_2$ from the plurality of pieces of image data $I_2$ corresponding to the respective appropriate value candidates 35a. As a result, it is possible to obtain the image data having well-balanced image quality corresponding to the purpose of the user.

In the present embodiment, detecting the position of false color included in the image data $I_3$ obtained in the case where the effect of the variable optical LPF 11 is minimum or substantially minimum makes it possible to adopt, as the set value 74 of the variable optical LPF 11, a value in a case where the evaluation data D2 satisfies the standard corresponding to the position of false color. This makes it possible to obtain the image data I having inconspicuous false color even in the case where, for example, false color is generated in a very large region of the entire screen or even in the case where false color is generated at the center of the screen. Moreover, for example, even in the case where false color is present at four corners of the screen, unnecessary deterioration in resolution does not occur, and it is possible to obtain the image data I having inconspicuous false color.

In the present embodiment, in the case where the evaluation data D2 is derived on the basis of a difference between gray-scale data of two pieces of image data $I_1$ and $I_2$, and the saturation data 33 obtained from the image data $I_1$, it is possible to more accurately obtain the image data I having well-balanced image quality.

Moreover, in the present embodiment, the image data $I_1$ is generated by the imaging element 40 through driving the imaging element 40 in the case where the effect of the variable optical LPF 11 is maximum or substantially maximum. The evaluation data D1 and the evaluation data D2 are thereby derived on the basis of the image data $I_1$ having no false color or little false color and image data $I_2$ having false color, which makes it possible to accurately obtain the image data I having well-balanced image quality.

Further, in the present embodiment, in a case where the setting of the variable optical LPF 11 is performed in accordance with pressing the shutter button halfway, it is possible to perform an instruction for setting of the variable optical LPF 11 together with an instruction for setting of a condition of AF (autofocus) and a condition of an iris 14. This makes it possible to obtain the image data I having well-balanced image quality without increasing a workload for the user.

2. Modification Examples

Next, description is given of modification examples of the imaging apparatus 1 according to the foregoing embodiment.

Modification Example A

In the foregoing embodiment, the image processor 50 makes the effect of the variable optical LPF 11 maximum or substantially maximum in the step S102. However, the image processor 50 may set the effect of the variable optical LPF 11 to any value in the step S102. In this case, the image processor 50 may derive the saturation data 33 after performing processing of eliminating false color in a region where there is a possibility that false color is generated of the obtained image data In such a case, it is possible to reduce time necessary to obtain an appropriate set value for the variable optical LPF 11 as compared with a case where the effect of the variable optical LPF 11 is maximum or substantially maximum at first.

Modification Example B

In the foregoing embodiment and the modification example thereof, the variable optical LPF 11 changes the cut-off frequency fc by voltage control. However, in the foregoing embodiment and the modification example thereof, the controller 80 may change the cut-off frequency fc of the variable optical LPF 11 by frequency control. Moreover, in the foregoing embodiment and the modification example thereof, an optical LPF that changes the cut-off frequency fc in accordance with amplitude of physically applied oscillation may be used in the imaging apparatus 1 in place of the variable optical LPF 11. In other words, it is only necessary that the variable optical LPF in the present disclosure is allowed to adjust the cut-off frequency fc by voltage change, frequency change, or oscillation amplitude change, and any optical LPF may be used as long as the optical LPF is allowed to perform electronic control on the cut-off frequency fc.

Modification Example C

In the foregoing embodiment, the controller 80 automatically changes the effect of the variable optical LPF 11. However, the user may manually change the effect of the variable optical LPF 11.

FIG. 20 illustrates an example of an imaging procedure in the present modification example. First, after the steps S101 to S107 are executed, the image processor 50 determines whether or not changing of the effect of the variable optical LPF 11 is completed (step S120). The steps S105 to S107 are repeatedly executed until changing of the effect of the variable optical LPF 11 is completed. As a result, after changing of the effect of the variable optical LPF 11 is completed, the image processor 50 derives appropriate value candidates k (k1, k2, k3, . . . ) of the variable optical LPF 11 corresponding to positions each indicated by a white circle in FIG. 21 (step S121). It is to be noted that FIG. 21 illustrates an example of the evaluation data D1 and D2. Specifically, in a case where a plurality of ranges in which change (the cut-off frequency fc) in the evaluation data D2 with respect to the effect of the variable optical LPF 11 is relatively gentle are present, the image processor 50 uses a value corresponding to a position of an end (an end at which the effect of the variable optical LPF 11 is smaller) of each of the ranges as each of the appropriate value candidates k (k1, k2, k3, . . . ) of the variable optical LPF 11. Each of the appropriate value candidates k (k1, k2, k3, . . . ) corresponds to a set value of the variable optical LPF 11 in a case where the effect of the variable optical LPF 11 is weakest (a set value of the variable optical LPF 11 in a case where the cut-off frequency fc is largest) within a range in which the evaluation data D2 is not increased.

Next, the image processor 50 requests the user to select one piece of image data $I_2$ from the plurality of pieces of image data $I_2$ corresponding to the respective appropriate value candidates k (k1, k2, k3, . . . ). Specifically, the image processor 50 outputs, to the display unit 60, one piece of image data $I_2$ selected from the plurality of pieces of image data $I_2$ corresponding to the respective appropriate value candidates k (k1, k2, k3, . . . ). By doing so, the display unit 60 displays the image data $I_2$ inputted from the controller 80 (step S122). The image processor 50 sequentially outputs, to the display unit 60, the plurality of pieces of image data $I_2$ corresponding to the respective appropriate value candidates k. Every time an display instruction from the user (for example, pressing an operation button attached to the main body of the imaging apparatus 1, turning an operation dial attached to the main body of the imaging apparatus 1, or the like) is detected, the image processor 50 outputs the plurality of pieces of image data $I_2$ to the display unit 60 so as to change from the image data $I_2$ (the image data $I_2$ corresponding to the appropriate value candidate k) displayed on the display unit 60 to another image data $I_2$ corresponding to the appropriate value candidate k. The display unit 60 changes the image data $I_2$ to be displayed every time the image data $I_2$ is inputted from the image processor 50. In a case where a selection instruction (for example, pressing another operation button attached to the main body of the imaging apparatus 1, or the like) is detected, the image processor 50 determines, as the set value 74, the appropriate value candidate k corresponding to the image data $I_2$ displayed on the display unit 60 upon such detection. Thus, the image processor 50 causes the user to select the image data $I_2$ appropriate for the user (or an appropriate value 35 appropriate for the user) (step S123).

In the present modification example, for example, every time the user presses the operation button attached to the main body of the imaging apparatus 1 once or turns the operation dial attached to the main body of the imaging apparatus 1, the image processor 50 is allowed to set, as the set value of the variable optical LPF 11, one set value k selected from a plurality of set values k. This makes it possible to reduce effort of manual setting by the user. Moreover, it is possible to obtain the image data I having user-intended balance between resolution and false color.

In the present modification example, the image processor 50 may perform enhancement on a region where resolution is changed in response to changing of the lowpass characteristics (the cut-off frequency fc) of the variable optical LPF 11 or a region where false color is generated or changed in response to changing of the lowpass characteristics (the cut-off frequency fc) of the variable optical LPF 11 in each of the image data $I_2$. The "enhancement" indicates distinguishing a target region from other regions (for example, making the target region more conspicuous than other regions). In this case, the image processor 50 may generate and output enhanced image data obtained through performing enhancement in response to changing of the lowpass characteristics (the cut-off frequency fc).

(Enlarged Display)

For example, in the present modification example, the image processor 50 may generate, from the respective image data $I_2$, data (enhanced image data) in which a position of false color included in the plurality of pieces of image data $I_2$ is enhanced (specifically enlarged), and may output the data to the display unit 60. At this time, for example, in a case where the set value of the variable optical LPF 11 is transitioned to a value (set value k) corresponding to a white circle in FIG. 21 in accordance with a request by the user, the image processor 50 may detect change in (or generation of) false color on the basis of the plurality of pieces of image data $I_2$ shot while changing the lowpass characteristics (the cut-off frequency fc). The image processor 50 may further generate, from the respective image data $I_2$, for example, data in which a region (a region 61) where false color is changed (or generated) by such transition is enhanced (specifically, enlarged) (refer to FIG. 22), and may output the data to the display unit 60. It is to be noted that FIG. 22 illustrates a state in which a portion of the image data $I_2$ is enlarged. In FIG. 22, the region 61 corresponds to a region displayed at a magnification (for example, 2 times) larger than a magnification of a region other than the region 61 in the image data $I_2$. For example, in a case where the set value of the variable optical LPF 11 is transitioned to the value (the set value k) corresponding to the white circle in FIG. 21 in accordance with a request by the user, the display unit 60 enhances and displays (specifically, enlarges and displays) the region (the region 61) where false color is changed (or generated) by such transition in the image data $I_2$. In such a case, even in a case where the display unit 60 is small and it is therefore difficult to visually recognize change in false color, it is possible to intuitively recognize the change in false color and a position where false color is generated. As a result, it is possible to easily adjust the effect of the variable optical LPF 11.

It is not necessary for the image processor 50 to enlarge all positions where false color is changed (or generated) in the image data $I_2$. The image processor 50 may output, to the display unit 60, for example, data in which a point (the region 61) where the evaluation data D2 is largest in the image data $I_2$ is enlarged.

(Zebra Display)

Moreover, for example, in the present modification example, the image processor 50 may generate, from the respective image data $I_2$, data (enhanced image data) in which the position of false color included in the plurality of pieces of image data $I_2$ is enhanced, and may output the data to the display unit 60. At this time, for example, in the case where the set value of the variable optical LPF 11 is transitioned to the value (the set value k) corresponding to the white circle in FIG. 21 in accordance with a request by the user, the image processor 50 may detect change in (or generation of) false color on the basis of the plurality of pieces of image data $I_2$ shot while changing the lowpass characteristics (the cut-off frequency fc). The image processor 50 may further generate, for example, data in which a region (a region 62) where false color is changed (or generated) by such transition is enhanced (specifically, subjected to zebra processing) from the respective image data $I_2$ (refer to FIG. 23), and may output data to the display unit 60. The zebra processing indicates that a zebra pattern is superimposed on an image. It is to be noted that FIG. 23 illustrates a state in which a portion of the image data $I_2$ is subjected to zebra processing. In FIG. 23, a state in which the region 62 is distributed from a center to a bottom end in the image data $I_2$ is illustrated as an example. For example, in the case where the set value of the variable optical LPF 11 is transitioned to the value (the set value k) corresponding to the white circle in FIG. 21 in accordance with a request by the user, the display unit 60 enhances and displays the region (the region 62) where false color is changed (or generated) in the image data $I_2$ (specifically displays the region with a zebra pattern). In such a case, even in the case where the display unit 60 is small and it is therefore difficult to visually recognize change in false color, it is possible to intuitively recognize the change in false color and a position where false color is generated. As a result, it is possible to easily adjust the effect of the variable optical LPF 11.

It is not necessary for the image processor 50 to perform zebra processing on all positions where false color is changed (or generated) in the image data $I_2$. The image processor 50 may output, to the display unit 60, for example, data in which a point (the region 62) where the evaluation data D2 is largest in the image data $I_2$ is subjected to zebra processing.

(Highlight Display)

Further, for example, in the present modification example, the image processor 50 may generate, from the respective image data 12, for example, data (enhanced image data) in which a position where deterioration in resolution occurs included in the plurality of pieces of image data $I_2$ is enhanced (specifically, highlighted), and may output the data to the display unit 60. For example, in a case where the set value of the variable optical LPF 11 is transitioned to the value (the set value k) corresponding to the white circle in FIG. 21 in accordance with a request by the user, the image processor 50 may detect change in resolution on the basis of the plurality of pieces of image data $I_2$ shot while changing the lowpass characteristics (the cut-off frequency fc). The image processor 50 may further generate data in which an edge (a portion 63) of a region where resolution is changed by such transition is enhanced (specifically, highlighted) from the respective image data $I_2$ (refer to FIG. 24), and may output the data to the display unit 60. Highlighting is performed, for example, by change in luminance of the image data $I_2$, change in saturation of the image data $I_2$, or superimposition of a color signal on the image data $I_2$. It is to be noted that FIG. 24 illustrates a state in which a portion (the portion 63) of the image data $I_2$ is enhanced. In FIG. 24, a state in which the portion 63 includes a plurality of line segments is illustrated as an example. For example, in the case where the set value of the variable optical LPF 11 is transitioned to the value (the set value k) corresponding to the white circle in FIG. 21 in accordance with a request by the user, the display unit 60 enhances and displays (specifically, highlights and displays) the edge (the portion 63) of the region where resolution is changed in the image data $I_2$. In such a case, even in a case where the display unit 60 is small and it is therefore difficult to visually recognize deterioration in resolution, it is possible to intuitively recognize a point where deterioration in resolution occurs. As a result, it is possible to easily adjust the effect of the variable optical LPF 11.

It is not necessary for the image processor 50 to highlight all edges of the region where resolution is changed (or occurs) in the image data $I_2$. The image processor 50 may output, to the display unit 60, for example, data in which a point (the portion 63) where the evaluation data D1 is largest in the image data $I_2$ is highlighted.

(Mixture of Enhancement)

Furthermore, in the present modification example, the image processor 50 may perform a plurality of kinds of enhancement on each of the image data $I_2$. The image processor 50 may generate, from the respective image data $I_2$, data in which a position of false color and a position where deterioration in resolution occurs included in the plurality of pieces of image data $I_2$ are enhanced, and may output the data to the display unit 60. For example, in a case where the set value of the variable optical LPF 11 is transitioned to the value (the set value k) corresponding to the white circle in FIG. 21 in accordance with a request by the user, the image processor 50 may detect change in (or generation of) false color and change in resolution on the basis of the plurality of pieces of image data $I_2$ shot while changing the lowpass characteristics (the cut-off frequency fc).

The image processor 50 may generate data in which the region 61 where false color is changed (or generated) by such transition is enhanced (specifically, enlarged) and the edge (the portion 63) of the region where resolution is changed by such transition is enhanced (specifically, highlighted) (refer to FIG. 25) from the respective image data $I_2$, and may output data to the display unit 60. At this time, the image processor 50 may cause a display color of the region 61 and a display color of the portion 63 to be different from each other. In the case where the set value of the variable optical LPF 11 is transitioned to the value (the set value k) corresponding to the white circle in FIG. 21 in accordance with a request by the user, the display unit 60 enhances (specifically, enlarges) the region 61 where false color is changed (or generated) in the image data $I_2$ and enhances and displays (specifically, highlights and displays) the edge (the portion 63) of the region where resolution is changed in the image data $I_2$. In such a case, even in the case where the display unit 60 is small and it is therefore difficult to visually recognize deterioration in resolution, it is possible to intuitively recognize a point where deterioration in resolution occurs. As a result, it is possible to easily adjust the effect of the variable optical LPF 11.

The image processor 50 may generate data in which the region 62 where false color is changed (or generated) by such transition is enhanced (specifically, subjected to zebra processing) and the edge (the portion 63) of the region where resolution is changed by such transition is enhanced (specifically, highlighted) from the respective image data $I_2$ (refer to FIG. 26), and may output the data to the display unit 60. In the case where the set value of the variable optical LPF 11 is transitioned to the value (the set value k) corresponding to the white circle in FIG. 21 in accordance with a request by the user, the display unit 60 enhances (specifically, performs zebra processing on) the region 62 where false color is changed (or generated) and enhances and displays (specifically, highlights and displays) the edge (the portion 63) of the region where resolution is changed. In such a case, even in the case where the display unit 60 is small and it is therefore difficult to visually recognize deterioration in resolution, it is possible to intuitively recognize a point where deterioration in resolution occurs. As a result, it is possible to easily adjust the effect of the variable optical LPF 11.

(Decrease in Enhancement)

Moreover, in the present modification example, the image processor 50 may change a degree of enhancement (enlargement, zebra patterning, or highlighting) on the image data $I_2$ in response to changing of the lowpass characteristics (the cut-off frequency fc). At this time, the image processor 50 may generate enhanced image data while gradually decreasing the degree of enhancement on the image data $I_2$, and may output the enhanced image data to the display unit 60.

For example, the image processor 50 generates data (enhanced image data) in which a predetermined point in the image data $I_2$ is enhanced (enlarged) by a magnification of 2.0 times at a certain point in time and outputs the data to the display unit 60, as illustrated in (A) of FIG. 27. Thereafter, the data (the enhanced image data) in which the predetermined point is enhanced (enlarged) by a magnification of 2.0 times is continuously displayed on the display unit 60 for a predetermined time period without changing the lowpass characteristics (the cut-off frequency fc). In this case, for example, the image processor 50 may generate data (enhanced image data) in which the magnification of the predetermined point is decreased from 2.0 times to 1.5 times and may output the data to the display unit 60. In other words, in a case where a time period from outputting the enhanced image data to the display unit 60 to outputting another enhanced image data to the display unit 60 exceeds a predetermined length, the image processor 50 may generate data (enhanced image data) in which the degree of enhancement (enlargement) on the image data $I_2$ is decreased and may output the data to the display unit 60. At this time, the image processor 50 may generate enhanced image data while gradually decreasing the degree of enhancement (enlargement) on the image data $I_2$ and may output the enhanced image data. Consequently, the image processor 50 may output, for example, data in which the magnification of the predetermined point is 1.0 time (that is, the image data $I_2$ that is not enhanced) to the display unit 60, as illustrated in (C) of FIG. 27.

For example, the image processor 50 generates data (enhanced image data) in which a predetermined point in the image data $I_2$ is enhanced with a dark zebra pattern (by zebra processing) at a certain point in time and outputs the data to the display unit 60, as illustrated in (A) of FIG. 28. Thereafter, the data (enhanced image data) in which the predetermined point is enhanced with the zebra pattern (by zebra processing) is continuously displayed on the display unit 60 for a predetermined time period without changing the lowpass characteristics (the cut-off frequency fc). In this case, the image processor 50 may generate, for example, data (enhanced image data) in which a shade of the zebra pattern at the predetermined point is decreased and outputs the data to the display unit 60, as illustrated in (B) of FIG. 28. In other words, in a case where a time period from outputting the enhanced image data to the display unit 60 to outputting another enhanced image data to the display unit 60 exceeds a predetermined length, the image processor 50 may generate data (enhanced image data) in which the degree of enhancement (zebra processing) on the image data $I_2$ is decreased and may output the data to the display unit 60. At this time, the image processor 50 may generate the enhanced image data while gradually decreasing the degree of enhancement (zebra processing) on the image data $I_2$ and may output the enhanced image data to the display unit 60. Consequently, the image processor 50 may output, for example, data in which the zebra pattern at the predetermined point is eliminated (that is, the image data $I_2$ that is not enhanced) to the display unit 60, as illustrated in (C) of FIG. 28.

For example, the image processor 50 generates data (enhanced image data) in which a predetermined point in the image data $I_2$ is thickly enhanced (highlighted) at a certain point in time and outputs the data to the display unit 60, as illustrated in (A) of FIG. 29. Thereafter, the data (enhanced image data) in which the predetermined point is thickly enhanced (highlighted) is continuously displayed on the display unit 60 for a predetermined time period without changing the lowpass characteristics (the cut-off frequency fc). In this case, the image processor 50 may generate, for example, data (enhanced image data) in which a thickness of a highlight at the predetermined point is decreased and may output the data to the display unit 60, as illustrated in (B) of FIG. 29. In other words, in a case where a time period from outputting the enhanced image data to the display unit 60 to outputting another enhanced image data to the display unit 60 exceeds a predetermined length, the image processor 50 may generate data (enhanced image data) in which the degree of enhancement (highlighting) on the image data $I_2$ is decreased and may output the data to the display unit 60. At this time, the image processor 50 may generate the enhanced image data while gradually decreasing the degree of enhancement (highlighting) on the image data $I_2$ and may output the enhanced image data to the display unit 60. Consequently, the image processor 50 may output, for example, data in which the highlight at the predetermined point is eliminated (that is, the image data $I_2$ that is not enhanced) to the display unit 60, as illustrated in (C) of FIG. 29.

(On-Off of Enhancement)

Moreover, in the present modification example, in accordance with a predetermined instruction from the user, the image processor 50 may output the image data $I_2$ that is not subjected to enhancement (enlargement, zebra patterning, or highlighting) or may output data (enhanced image data) subjected to enhancement (enlargement, zebra patterning, or highlighting). Here, the "predetermined instruction from the user" indicates, for example, pressing a shutter button halfway by the user and releasing the shutter button that is pressed halfway by the user in a case where the operation unit 90 includes the shutter button.

For example, the image processor 50 generates data (enhanced image data) in which a predetermined point in the image data $I_2$ is enhanced (enlarged) by a magnification of 2.0 times at a certain point in time and outputs the data to the display unit 60, as illustrated in (A) of FIG. 30. At this time, for example, in a case where the predetermined instruction from the user (pressing the shutter button by the user) is detected, the image processor 50 may output data in which the magnification of the predetermined point is 1.0 time (that is, the image data $I_2$ that is not enhanced) to the display unit 60 in accordance with the instruction, as illustrated in (B) of FIG. 30. Moreover, for example, in a case where the predetermined instruction from the user (releasing the shutter button that is pressed halfway by the user) is detected, the image processor 50 may generate, for example, data (enhanced image data) in which the predetermined point in the image data $I_2$ is enhanced (enlarged) by a magnification of 2.0 times and may output the data to the display unit 60 in accordance with the predetermined instruction, as illustrated in (A) of FIG. 30.

For example, the image processor 50 generates data (enhanced image data) in which a predetermined point in the image data $I_2$ is enhanced with a dark zebra pattern (by zebra processing) at a certain point in time and outputs the data to the display unit 60, as illustrated in (A) of FIG. 31. At this time, for example, in a case where the predetermined instruction from the user (pressing the shutter button by the user) is detected, the image processor 50 may output data in which the zebra pattern at the predetermined point is eliminated (that is, the image data $I_2$ that is not enhanced) to the display unit 60 in accordance with the instruction, as illustrated in (B) of FIG. 31. Moreover, for example, in a case where the predetermined instruction from the user (releasing the shutter button that is pressed halfway by the user) is detected, the image processor 50 may generate, for example, data (enhanced image data) in which the predetermined point is enhanced with a dark zebra pattern (by zebra processing) and may output the data to the display unit 60 in accordance with the instruction, as illustrated in (A) of FIG. 31.

For example, the image processor 50 generates data (enhanced image data) in which a predetermined point in the image data $I_2$ is thickly enhanced (highlighted) at a certain point in time and outputs the data to the display unit 60, as illustrated in (A) of FIG. 32. At this time, for example, in a case where the predetermined instruction from the user (pressing the shutter button by the user) is detected, the image processor 50 may output data in which a highlight at the predetermined point is eliminated (that is, the image data $I_2$ that is not enhanced) to the display unit 60 in accordance with the instruction, as illustrated in (B) of FIG. 32. Moreover, for example, in a case where the predetermined instruction from the user (releasing the shutter button that it pressed halfway by the user) is detected, the image processor 50 may generate, for example, data (enhanced image data) in which the predetermined point in the image data $I_2$ is thickly enhanced (highlighted) in accordance with the instruction, as illustrated in (A) of FIG. 32.

Incidentally, in order for the image processor 50 to enlarge the region 61 of the image data $I_2$ or to perform zebra processing on the region 62 of the image data $I_2$, it is necessary for the image processor 50 to specify the false color generation position in advance. Therefore, for example, in the steps in FIG. 20, it is necessary for the image processor 50 to perform the steps S117 to S119 before performing the step S105, as illustrated in FIG. 33. It is to be noted that FIG. 33 illustrates an example of an imaging procedure. Performing the step S117 to S119 makes it possible for the image processor 50 to specify the false color generation position. This makes it possible to perform enlargement of the region 61 and the zebra processing on the region 62.

Modification Example D

In the foregoing embodiment, in the step S117, automatic setting of the effect (the set value) of the variable optical LPF 11 is performed on the basis of a value (the evaluation data D) obtained through adding a value (the evaluation data D1) obtained from the first term on the right-hand side of the equation (1) and a value (the evaluation data D2) obtained from the second term on the right-hand side of the equation (1). However, the image processor 50 may perform automatic setting of the effect (the set value) of the variable optical LPF 11 on the basis of one value of the evaluation data D1 and the evaluation data D2. In such a case, the effect (the set value) of the variable optical LPF 11 is adjustable in accordance with various purposes.

Modification Example E

In the foregoing embodiment and the modification examples thereof, a lowpass filter having a fixed cut-off frequency may be provided in place of the variable optical LPF 11. Moreover, in the foregoing embodiment and the modification examples thereof, the variable optical LPF 11 may be omitted. In these cases, the imaging apparatus 1 may include a driving unit that oscillates the light reception surface 40A of the imaging element 40 in an in-plane direction. At this time, a device including the imaging element 40 and the driving unit that oscillates the light reception surface 40A serves as a so-called imager shift type lowpass filter. Thus, even in a case where the imager shift type lowpass filter is provided, it is possible to obtain the image data I having well-balanced image quality corresponding to the purpose of the user, as with the foregoing embodiment.

Modification Example F

In the foregoing embodiment and the modification examples thereof, a lowpass filter having a fixed cut-off frequency may be provided in place of the variable optical LPF 11. Moreover, in the foregoing embodiment and the modification examples thereof, the variable optical LPF 11 may be omitted. In these cases, the lens driving unit 20 may drive the lens 12 in a plane parallel to a plane orthogonal to an optical axis of the lens 12. At this time, a device including the lens 12 and the lens driving unit 20 may serve as a so-called a lens shift type lowpass filter. Thus, even in a case where the lens shift type lowpass filter is provided, it is possible to obtain the image data I having well-balanced image quality corresponding to the purpose of the user, as with the foregoing embodiment.

Modification Example G

In the foregoing embodiment and the modification examples thereof, the imaging apparatus 1 is applicable to an in-vehicle camera, a surveillance camera, a medical camera (an endoscope camera), etc. in addition to typical cameras.

Although the present disclosure has been described with reference to the embodiment and the modification examples thereof, the present disclosure is not limited to the foregoing embodiment, etc., and may be modified in a variety of ways. It is to be noted that the effects described in the description are merely illustrative. Effects of the present disclosure are not limited to the effects described in the description. The present disclosure may have any effect other than the effects described in the description.

Moreover, the present disclosure may have the following configurations, for example.

(1)
A display control apparatus, including:
a display controller that performs enhancement on a region where resolution is changed in response to changing of the lowpass characteristics or a region where false color is generated or changed in response to changing of the lowpass characteristics in image data generated on a basis of light incident via a lowpass filter.

(2)
The display control apparatus according to (1), in which a mode of the enhancement is enlargement, zebra patterning, or highlighting.

(3)
The display control apparatus according to (1), in which the display controller performs the enhancement by change in luminance in the image data, change in saturation of the image data, or superimposition of a color signal on the image data.

(4)
The display control apparatus according to (1), in which change in resolution indicates a decrease in spatial frequency.

(5)
The display control apparatus according to any one of (1) to (4), in which the display controller detects change in the resolution or generation of or change in the false color on a basis of a plurality of pieces of the image data shot while changing the lowpass characteristics.

(6)
The display control apparatus according to any one of (1) to (5), in which the display controller generates and outputs, in response to changing of the lowpass characteristics, enhanced image data obtained through performing the enhancement.

(7)
The display control apparatus according to (6), in which the display controller controls outputting of the enhanced image data in accordance with a predetermined instruction from a user to change from one displayed on a display unit of the enhanced image data to another one of the enhanced image data.

(8)
The display control apparatus according to any one of (1) to (7), in which the display controller changes a degree of the enhancement on the image data in response to changing of the lowpass characteristics.

(9)
The display control apparatus according to any one of (1) to (8), in which the display controller outputs the image data that is not subjected to the enhancement in accordance with a predetermined instruction from a user.

(10)
The display control apparatus according to any one of (1) to (9), further including a characteristic controller that performs control to change the lowpass characteristics of the lowpass filter.

(11)
An imaging apparatus, including:
an imaging element that generates image data on a basis of light incident via a lowpass filter; and
a display controller that performs enhancement on a region where resolution is changed in response to changing of the lowpass characteristics or a region where false color is generated or changed in response to changing of the lowpass characteristics in the image data generated by the imaging element.

This application claims the benefit of Japanese Priority Patent Application No. 2016-092994 filed with the Japan Patent Office on May 6, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A display control apparatus, comprising:
processing circuitry configured to:
obtain image data of an image generated on a basis of light incident via an optical filter;
determine, according to the image data, a region in the image where a change of resolution in response to a change of a lowpass filter characteristic of the optical filter or a change of false color status in response to the change of the lowpass filter characteristic of the optical filter is detected;
perform enhancement of the image data in the region of the image to obtain enhanced image data; and
output the enhanced image data for display.

2. The display control apparatus according to claim 1, wherein the enhancement includes enlargement, zebra patterning, or highlighting.

3. The display control apparatus according to claim 1, wherein the enhancement includes a change in luminance in the image data, a change in saturation of the image data, or superimposition of a color signal on the image data.

4. The display control apparatus according to claim 1, wherein the change of resolution corresponds to a decrease in a spatial frequency.

5. The display control apparatus according to claim 1, wherein the processing circuitry is configured to detect the change of the resolution or the change of the false color status on a basis of a plurality of images shot while changing the lowpass filter characteristic of the optical filter.

6. The display control apparatus according to claim 1, wherein the processing circuitry is configured to obtain and output the enhanced image data for display in response to the change of the lowpass filter characteristic of the optical filter.

7. The display control apparatus according to claim 1, wherein the processing circuitry is configured to obtain and output the enhanced image data in response to a user instruction according to a type of enhancement determined according to the user instruction.

8. The display control apparatus according to claim 1, wherein the processing circuitry is configured to change a degree of the enhancement in response to the change of the lowpass filter characteristic of the optical filter.

9. The display control apparatus according to claim 1, wherein the processing circuitry is configured to output the image data that is not subjected to the enhancement in response to a user instruction.

10. The display control apparatus according to claim 1, wherein the processing circuitry is further configured to control the change of the lowpass filter characteristic of the optical filter.

11. An imaging apparatus, comprising:
an imaging element that generates image data of an image on a basis of light incident via an optical filter; and
processing circuitry configured to:
determine, according to the image data, a region in the image where a change of resolution in response to a change of a lowpass filter characteristic of the optical filter or a change of false color status in response to the change of the lowpass filter characteristic of the optical filter is detected;
perform enhancement of the image data in the region of the image to obtain enhanced image data; and
output the enhanced image data for display.

12. The imaging apparatus according to claim 11, wherein the enhancement includes enlargement, zebra patterning, or highlighting.

13. The imaging apparatus according to claim 11, wherein the enhancement includes a change in luminance in the image data, a change in saturation of the image data, or superimposition of a color signal on the image data.

* * * * *